(12) United States Patent
Kato

(10) Patent No.: US 7,218,593 B2
(45) Date of Patent: May 15, 2007

(54) RECORDING STRATEGY GENERATION METHOD AND AN OPTICAL INFORMATION RECORDING MEDIUM

(75) Inventor: Masaki Kato, Kanagawa (JP)

(73) Assignee: Ricoh Company, Ltd. (JP)

( * ) Notice: Subject to any disclaimer, the term of this patent is extended or adjusted under 35 U.S.C. 154(b) by 639 days.

(21) Appl. No.: 10/430,411

(22) Filed: May 7, 2003

(65) Prior Publication Data
US 2004/0017755 A1    Jan. 29, 2004

(30) Foreign Application Priority Data
May 10, 2002    (JP) .............................. 2002-136118

(51) Int. Cl.
*G11B 7/00*    (2006.01)
(52) U.S. Cl. ................. 369/59.11; 369/59.13
(58) Field of Classification Search ........... None
See application file for complete search history.

(56) References Cited

U.S. PATENT DOCUMENTS

| 5,732,062 | A | 3/1998 | Yokoi et al. |
| 6,757,232 | B2 | 6/2004 | Yamada et al. |
| 6,791,926 | B1 * | 9/2004 | Furumiya et al. ......... 369/53.13 |
| 6,801,240 | B2 * | 10/2004 | Abe et al. ................... 347/252 |
| 6,886,177 | B2 | 4/2005 | Katoh et al. |
| 6,975,577 | B2 | 12/2005 | Kato |
| 2001/0017833 | A1 | 8/2001 | Yamada et al. |
| 2001/0021154 | A1 | 9/2001 | Katoh et al. |
| 2002/0021594 | A1 | 2/2002 | Nakamura et al. |
| 2002/0075789 | A1 | 6/2002 | Katoh et al. |
| 2003/0026195 | A1 | 2/2003 | Kato |
| 2003/0043712 | A1 | 3/2003 | Nakamura et al. |
| 2003/0044719 | A1 | 3/2003 | Katoh et al. |
| 2003/0227850 | A1 * | 12/2003 | Kato et al. ............... 369/59.11 |

FOREIGN PATENT DOCUMENTS

| EP | 1 128 366 A2 | 8/2001 |
| EP | 1 182 649 A1 | 2/2002 |
| JP | 09138947 A | 5/1997 |
| JP | 09219021 A | 8/1997 |

* cited by examiner

*Primary Examiner*—Thang V. Tran
*Assistant Examiner*—Lixi Chow
(74) *Attorney, Agent, or Firm*—Dickstein Shapiro LLP

(57) ABSTRACT

An optical information recording medium is capable of supplying an optimum recording strategy for a high-speed recording, and for a plurality of scanning speeds, using a smaller number of parameters than conventionally required. The parameters include: $T_{d1}/T$ that specifies the rising time of the first pulse; $T_{d1}'/T$ that specifies the rising time of the first pulse, where n=3; $T_{d2}/T$ that specifies the rising time of the last off-pulse; $T_{d2}'/T$ that specifies the rising time of the last off-pulse, where n=3; $T_{mp}/T$ that specifies an irradiation period for all the pulses other than the last pulse, when n is an odd number; $T_{mp}'/T$ that specifies the irradiation period of the pulse, where n=3; $\delta/T$ that compensates for the irradiation period of the last pulse, where n is an odd number; and constants a and b. All or certain selections of the parameters are encoded and pre-formatted, for example, in vacant domains such as domains other than M1, S1 and F1 of the Additional Information-1 of the optical information recording medium.

6 Claims, 18 Drawing Sheets

(a) REAL TIME  (b) NORMALIZED BY T(v)

FIG.15

PARAMETER : Td1

| M2 | M3 | M4 | VALUE |
|----|----|----|-------|
| 0 | 0 | 0 | Td1/T = 0.00 |
| 0 | 0 | 1 | Td1/T = 0.25 |
| 0 | 1 | 0 | Td1/T = 0.38 |
| 0 | 1 | 1 | Td1/T = 0.50 |
| 1 | 0 | 0 | Td1/T = 0.63 |
| 1 | 0 | 1 | Td1/T = 0.75 |
| 1 | 1 | 0 | Td1/T = 0.88 |
| 1 | 1 | 1 | Td1/T = 1.00 |

PARAMETER : Td2

| M5 | M6 | M7 | VALUE |
|----|----|----|-------|
| 0 | 0 | 0 | Td2/T = −1.00 |
| 0 | 0 | 1 | Td2/T = −0.75 |
| 0 | 1 | 0 | Td2/T = −0.50 |
| 0 | 1 | 1 | Td2/T = −0.25 |
| 1 | 0 | 0 | Td2/T = 0.00 |
| 1 | 0 | 1 | Td2/T = 0.25 |
| 1 | 1 | 0 | Td2/T = 0.50 |
| 1 | 1 | 1 | Td2/T = 1.00 |

PARAMETER : Td2'

| M8 | S2 | S3 | VALUE |
|----|----|----|-------|
| 0 | 0 | 0 | Td2'/T = −1.00 |
| 0 | 0 | 1 | Td2'/T = −0.75 |
| 0 | 1 | 0 | Td2'/T = −0.50 |
| 0 | 1 | 1 | Td2'/T = −0.25 |
| 1 | 0 | 0 | Td2'/T = 0.00 |
| 1 | 0 | 1 | Td2'/T = 0.25 |
| 1 | 1 | 0 | Td2'/T = 0.50 |
| 1 | 1 | 1 | Td2'/T = 1.00 |

PARAMETER : Tmp

| S4 | S5 | S6 | VALUE |
|----|----|----|-------|
| 0 | 0 | 0 | Tmp/T = 0.50 |
| 0 | 0 | 1 | Tmp/T = 0.63 |
| 0 | 1 | 0 | Tmp/T = 0.75 |
| 0 | 1 | 1 | Tmp/T = 0.88 |
| 1 | 0 | 0 | Tmp/T = 1.00 |
| 1 | 0 | 1 | Tmp/T = 1.17 |
| 1 | 1 | 0 | Tmp/T = 1.33 |
| 1 | 1 | 1 | Tmp/T = 1.50 |

PARAMETER : Tmp'

| S7 | S8 | F2 | VALUE |
|----|----|----|-------|
| 0 | 0 | 0 | Tmp'/T = 0.50 |
| 0 | 0 | 1 | Tmp'/T = 0.75 |
| 0 | 1 | 0 | Tmp'/T = 1.00 |
| 0 | 1 | 1 | Tmp'/T = 1.20 |
| 1 | 0 | 0 | Tmp'/T = 1.40 |
| 1 | 0 | 1 | Tmp'/T = 1.60 |
| 1 | 1 | 0 | Tmp'/T = 1.80 |
| 1 | 1 | 1 | Tmp'/T = 2.00 |

PARAMETER : $\delta$

| F3 | F4 | F5 | VALUE |
|----|----|----|-------|
| 0 | 0 | 0 | $\delta/T = 0.00$ |
| 0 | 0 | 1 | $\delta/T = 0.07$ |
| 0 | 1 | 0 | $\delta/T = 0.14$ |
| 0 | 1 | 1 | $\delta/T = 0.21$ |
| 1 | 0 | 0 | $\delta/T = 0.28$ |
| 1 | 0 | 1 | $\delta/T = 0.35$ |
| 1 | 1 | 0 | $\delta/T = 0.72$ |
| 1 | 1 | 1 | $\delta/T = 0.50$ |

~11f

RECORDING STRATEGY GENERATION METHOD AND AN OPTICAL INFORMATION RECORDING MEDIUM

BACKGROUND OF THE INVENTION

1. Field of the Invention

The present invention generally relates to an optical information recording medium and a recording strategy generation method therefor, and especially relates to a phase-changing type optical information recording medium such as CD-RW, DVD-RAM, DVD-RW, and DVD+RW, and a recording strategy generation method therefor.

2. Description of the Related Art

In recent years and continuing, demands for high-speed recording using an optical information recording medium are increasing. Especially, since an optical disk-like recording medium is capable of raising recording and reproduction speeds by making rotational speed high, improvements in the speed are progressing. Since recording on the optical recording-medium is carried out by optical beam intensity modulation, a simple recording mechanism realizes optical recording, hence the medium and the mechanism can be provided economically. Further, since the intensity modulated optical beam is used in reproducing, high compatibility with a reproduction apparatus is secured. For this reason, the optical recording has been widely used, and the demands for even higher speeds and higher density are appearing along with demands for large capacity storage of electronic data.

Among such optical disks, disks that employ a phase-changing material are widely used, because they can be rewritten a large number of times. In the case of the optical disk that uses a phase-changing material, recording is carried out by applying an optical beam that is intensity modulated to a layer material. The layer is suddenly cooled such that it assumes an amorphous state, and the layer is gradually cooled such that it assumes a crystalline state. Since optical physical properties of the amorphous state differ from those of the crystalline state, optical information is recorded.

Since sudden cooling and gradual cooling are used, recording at a high speed is carried out by irradiating a recording optical beam that is three-value intensity modulated as disclosed by Japanese Provisional Publication No. H9-219021. As an actual recording method, a method disclosed by Japanese Provisional Publication No. H9-138947, Japanese Provisional Publication No. H9-219021, Recordable Compact Disk Systems Part III (commonly known as Orange Book Part III) version 2.0, ditto volume 2 version 1.1, and DVD+RW Basic Format Specifications version 1.1 will be herein below illustrated.

By the recording method disclosed by the above-mentioned documents, a mark as shown by (a) in FIG. 24 is recorded as follows. Where the mark is present, it is represented by a High signal, and where there are no marks (i.e., where there is a space), it is represented by a Low signal as shown by (b) of FIG. 24. The time length of the mark and the space is defined as n times a basic clock period T. In other words, the time length of the mark is expressed by nT. The range of n, a natural number, depends on modulating methods. Specifically, in the case of CD systems, n is between 3 and 11; and in the case of DVD systems, n is between 3 and 11, and 14. FIG. 24 shows the case of n=6.

According to the conventional technology as described above, in order to form the mark of the time length nT, a multi-pulse containing m pulses is irradiated as shown in (c) of FIG. 24. The number m is dependent on n, and is defined as m=n−1 or m=n−2. The definition is derived from the minimum value of n being 3 in the cases of CD and DVD. Further, an irradiation cycle of the pulse is set at 1T as shown in (c) of FIG. 24, which is the case of m=n−1. The same is said of the case of m=n−2, i.e., irradiation cycle of the pulse is set to 1T as shown in (d) of FIG. 24. In either of these cases, however, the cycle and the width of the first cycle are uniquely set up (different from the other pulses).

This recording method is considered to be suitable for the mark length recording method, since only an addition of a pulse is necessary for a mark that is longer by 1T.

However, when a faster recording speed is required, the basic clock frequency has to become high, for example, about 104 MHz for a 24×CD-RW, and about 131 MHz for a DVD-RW and DVD+RW, which are equivalent to 5×. With such a high clock frequency, considerable portions of the irradiation period are consumed by rising and falling of an irradiation pulse, lowering effective irradiation energy, i.e., an integrated value of the irradiation by the conventional recording method (recording strategy) as shown by FIG. 25.

In FIG. 25, dotted lines indicate ideal irradiation waveforms, and solid lines indicate simulated actual waveforms. Time period consumed by rising and falling of the pulse is shown in (a) of FIG. 25. As the basic clock frequency is raised as shown in (b) of FIG. 25, a ratio of the rising time and a ratio of the falling time to the whole period become higher, and for this reason, a peak power Pw becomes not high enough, and a bottom power Pb becomes not low enough. That is, the peak power Pw is lowered by ΔPw, and the bottom power Pb is raised by ΔPb. The lower peak power Pw can raise temperature of only a small volume of the layer material, therefore, only a small volume of an amorphous domain can be formed. The higher bottom power Pb suppresses sudden cooling, therefore, re-crystallization will be promoted, and the volume of the amorphous domain will be decreased as a result. Therefore, the small volume of the amorphous domain causes a fall of reproduction signal amplitude, and reproduction reliability is remarkably degraded.

In order to solve the above-mentioned problem, a optical beam source (a laser diode and its drive) that is capable of providing a beam with short rising time and falling time is required. For a clock frequency exceeding 100 MHz, the rising time and the falling time have to be 1 ns or less, which is difficult to obtain.

Then, technology (later technology) that carries out high-speed recording with the present luminescence optical beam source is proposed by Japanese Provisional Publication No. H9-134525 and U.S. Pat. No. 5,732,062 specification, wherein the number of recording pulses is reduced. According to the later technology, in order to form a mark having time length nT, m pulses are used, where m fulfills n=2m if n is an even number, and n=2m+1 if n is an odd number, comparing with the previous technology that uses (n−1) pulses when making the nT long mark. More specifically, in the EFM (eight-to-fourteen modulation) method adopted by CD-RW, according to the previous technology, since n is a natural number selected from 3, and 4, 5, 6, 7, 8, 9, 10 and 11, the number of irradiation pulses is 2, 3, 4, 5, 6, 7, 8, 9, and 10, respectively. In contrast, in the later technology, to n=3, 4, 5, 6, 7, 8, 9, 10 and 11, the number of irradiation pulses is set to 1, 2, 2, 3, 3, 4, 4, 5, and 5, respectively, that is, the number of the irradiation pulses becomes about one half of the previous technology. As shown in (c) of FIG. 25, the irradiation period of one pulse is expanded from about 0.5T (in the case of the previous technology) to about 1T in the later technology, alleviating adverse influence of the rising time and the falling time.

Since a 2mT long mark and a (2m+1)T long mark are recorded by the same number of pulses, the irradiation period cannot be a constant. In order to differentiate the two marks, the irradiation period (period of P=Pw) and the cooling period (period of P=Pb) of a pulse of the 2mT long mark are shortened.

Japanese Provisional Publication 2001-331936 discloses a recording method using m multi-pulses in order to form an nT long recording mark, wherein a ratio n/m is set as being equal to or greater than 1.25, and describes in detail the technology for recording a 2mT long mark and a (2m+1)T long mark by the same number of pulses m, like the case of the Provisional Publication No. H9-134525. As for the method for differentiating length of marks formed by irradiating the same number of pulses of this technology, the irradiation period and the cooling period of the first pulse, and the irradiation period and the cooling period of the last pulse are adjusted.

The method of differentiating length of marks formed by irradiating the same number of pulses basically requires that the irradiation period and the cooling period of all the pulses be defined to each mark length. EFM (eight to fourteen modulation) used by the compact disk requires 69 parameters to be defined; and EFM+ (a kind of 8–16 modulation) used by DVD requires 77 parameters to be defined. Techniques are proposed in order to reduce the number of parameters to be defined, namely, a technique of unifying the irradiation period of the first pulse regardless of n where m>=3, a technique of unifying the irradiation period and the cooling period of a middle pulse (i.e., a pulse except the first pulse and the last pulse) where m>=3, etc. However, in the cases that m=1 and m=2 (i.e., n<=5), it is considered necessary to set up parameters uniquely for each of the cases. Therefore, in order to define a recording luminescence waveform (recording strategy), a large number of parameters are needed. Furthermore, when recording speed (scanning speed) differs, a different pattern for every recording speed is needed, which is considered solvable by defining a unified constant absolute irradiation period where P=Pw, which is not depending on recording speed (not a value relative to the clock cycle that changes with recording speed but an actual period of pulse width).

Further, in the case of the write-once type and re-writable optical disk, typically, CD-R/RW and DVD+RW/R, it is common to pre-format the parameters concerning disk recording conditions on the disk itself. Examples of pre-formatting the disk recording conditions are information recorded in ATIP (Absolute Time in Pregroove) Extra Information of CD-R/RW, and Physical Information recorded in ADIP (Address in Pre-groove) of DVD+RW/R. The information contains scanning speed, optimum recording power, parameters required in order to compute the optimum recording power from a test recording, parameters for specifying optimum recording strategy, and the like, in addition to basic parameters such as the kind of disk and the version of the base standard. As for the parameters for specifying the optimum recording strategy, the standards document of CD-RW sets forth $\epsilon$(=Pe/Pw) and Strategy Optimization (dT$_{top}$, dT$_{era}$); and the standards document of DVD+RW sets forth T$_{top}$, dT$_{top}$, T$_{mp}$, dT$_{era}$, $\epsilon$1 and $\epsilon$2.

An information recording apparatus reads the information, when recording on the disk, and determines the recording strategy. Therefore, while it is desirable that the parameters are prepared in detail in order for the information recording apparatus to set up an exact recording strategy, the amount of the information should not be extremely large. Especially, in the case of a CD-R/RW system, the amount of information (capacity) that can be pre-formatted is limited to 21 bits×6=126 bits. When additional information should be provided, it is necessary to record the additional information using a pre-pit, using a domain newly defined in the innermost part or the outermost part of the disk, for example, XAA (Extra Additional Information Area) adopted by CD-R Multi-speed, etc.

The information recording apparatus reads the pre-formatted information prior to starting the recording operation as mentioned above, and optimum recording strategy is set up. Therefore, if a large number of parameters are set up for every disk, process becomes complicated, and a strategy generating circuit becomes complicated.

Accordingly, it is desired that an exact strategy be generated with a least number of parameters.

SUMMARY OF THE INVENTION

The purpose of the present invention is to provide a recording strategy generation method that is capable of generating the optimum strategy for a plurality of high scanning line speeds, wherein only a small number of parameters are required, and an optical information recording medium using the recording strategy generation method that substantially obviates one or more of the problems caused by the limitations and disadvantages of the related art.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by a recording strategy generation method that is capable of generating the optimum strategy for a plurality of high scanning line speeds, and an optical information recording medium using the method, wherein only a small number of parameters are used, particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an optical information recording medium that is pre-formatted with information that represents parameters for structuring the recording strategy. The parameters include:

$T_{d1}/T$ that specifies a rising time of the first pulse;

$T_{d1}'/T$ that specifies the rising time of the first pulse, where n=3;

$T_{d2}/T$ that specifies the rising time of the last off-pulse;

$T_{d2}'/T$ that specifies the rising time of the last off-pulse, where n=3;

$T_{mp}/T$ that specifies an irradiation period for all the on-pulses other than the last pulse, where n is an odd number;

$T_{mp}'/T$ that specifies the irradiation period of the on-pulse, where n=3;

$\delta/T$ that compensates for the irradiation period of the last pulse, where n is an odd number; and a and b, which are constants.

Information that represents all or certain selections of the above-listed parameters is pre-formatted in the lead-in domain of the optical information recording medium by encoding the wobbling of the groove, such that the optimum recording strategy can be configured disk by disk for a plurality of scanning speeds.

The certain-selections include the case where only 5 parameters are selected. The total number of parameters is nine. Thus, the number of parameters required to configure the recording strategy is remarkably reduced by the present invention in comparison with the conventional technology that requires 69 or 77 parameters.

The present invention provides preferred ranges for each of the parameters.

The present invention also provides the method for generating the recording strategy using the above-mentioned parameters.

BRIEF DESCRIPTION OF THE DRAWINGS

FIG. 15 shows a conversion table for then parameter $T_{d1}$;

FIG. 16 shows a conversion table for the parameter $T_{d2}$;

FIG. 17 shows a conversion table for the parameter $T_{d2}'$;

FIG. 18 shows a conversion table for the parameters $T_{mp}$;

FIG. 19 shows a conversion table for the parameter $T_{mp}'$;

FIG. 20 shows a conversion table for the parameter $\delta$;

DESCRIPTION OF THE PREFERRED EMBODIMENTS

In the following, embodiments of the present invention will be described with reference to the accompanying drawings.

The embodiments are applied to an information recording method and an information recording apparatus (including an information reproducing apparatus) for an optical information recording medium, especially an optical phase-changing type information recording medium, which is capable of recording, erasing, and rewriting data by intensity modulation of an irradiated optical beam.

Recording on the optical information recording medium is carried out by irradiating and scanning an optical beam that is intensity modulated such that a recording mark is formed on the optical information recording medium. The recording mark is a domain where optical characteristics are made different from other places by irradiating the optical beam, and is formed in a recording layer of the optical information recording medium. An information reproducing apparatus reproduces recorded information, reading the difference in the optical characteristics of the recording mark. The status of the recording mark depends on kinds of recording layer materials. For example, in the case of a magnetic recording medium, the recording mark is a domain where magnetic orientation differs from other places, and, in the case of a recording medium that uses a phase-changing material, the recording mark is a domain where phase is different from other places. The optical information recording medium using the phase-changing material, which is the most common rewritable optical information recording medium at present, uses the crystalline phase and the amorphous phase (amorphous layer) of a recording layer material. The phase-changing recording layer material includes a SbTe system alloy, a GeSbTe system alloy, an AgInSbTe system alloy, and a GaGeSbTe system alloy. Since the optical characteristics of the crystalline phase differ greatly from the amorphous phase, the phase-changing recording layer material can record information by forming an amorphous phase mark in a crystalline phase domain. Further, where the transition between crystalline phase and amorphous phase is reversible, a rewritable optical information recording medium is made possible.

(Information Recording Method)

Figure 1:
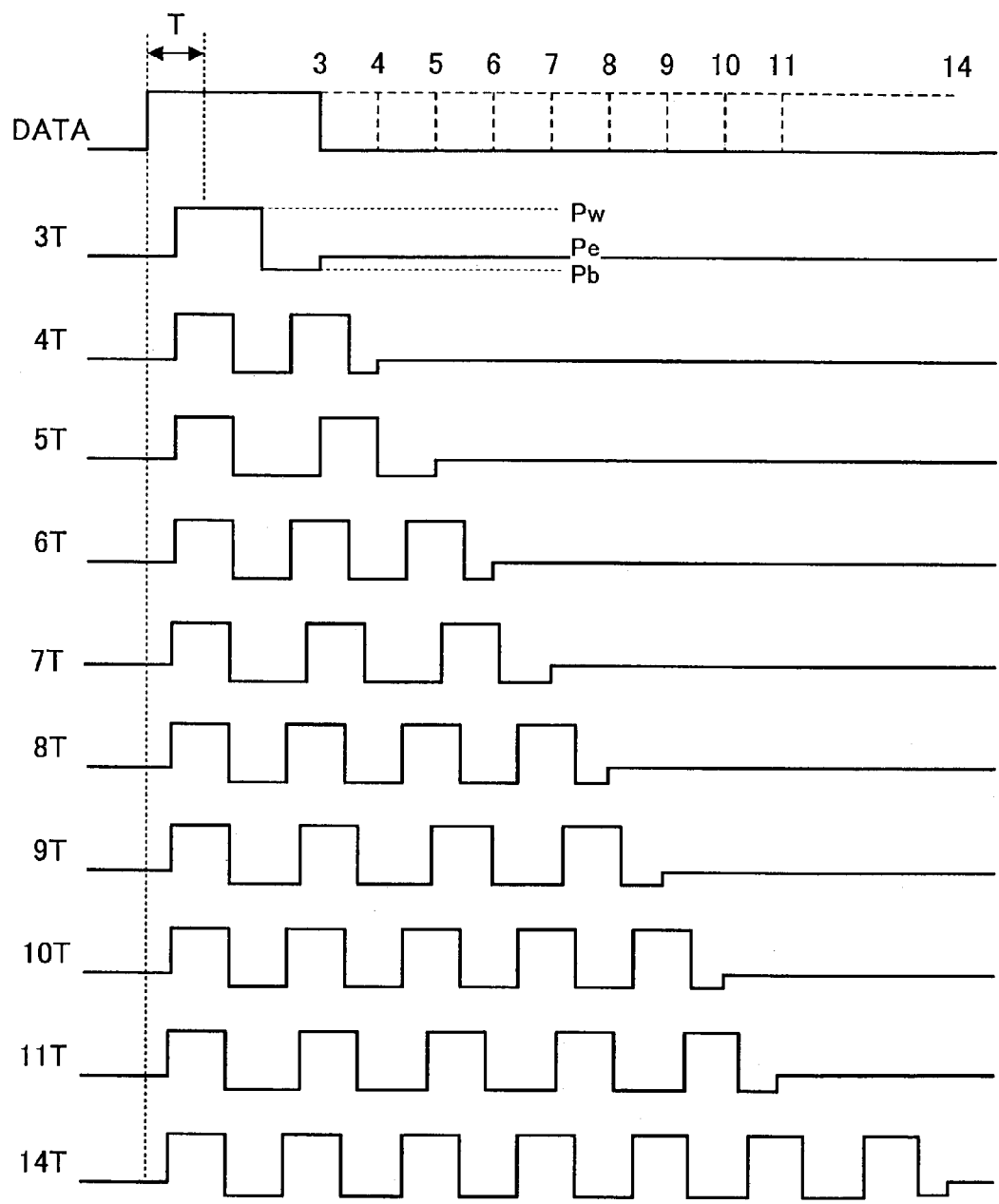
FIG. 1 is a wave form chart showing an outline of the recording strategy according to an embodiment of the present invention.
Figure 2:
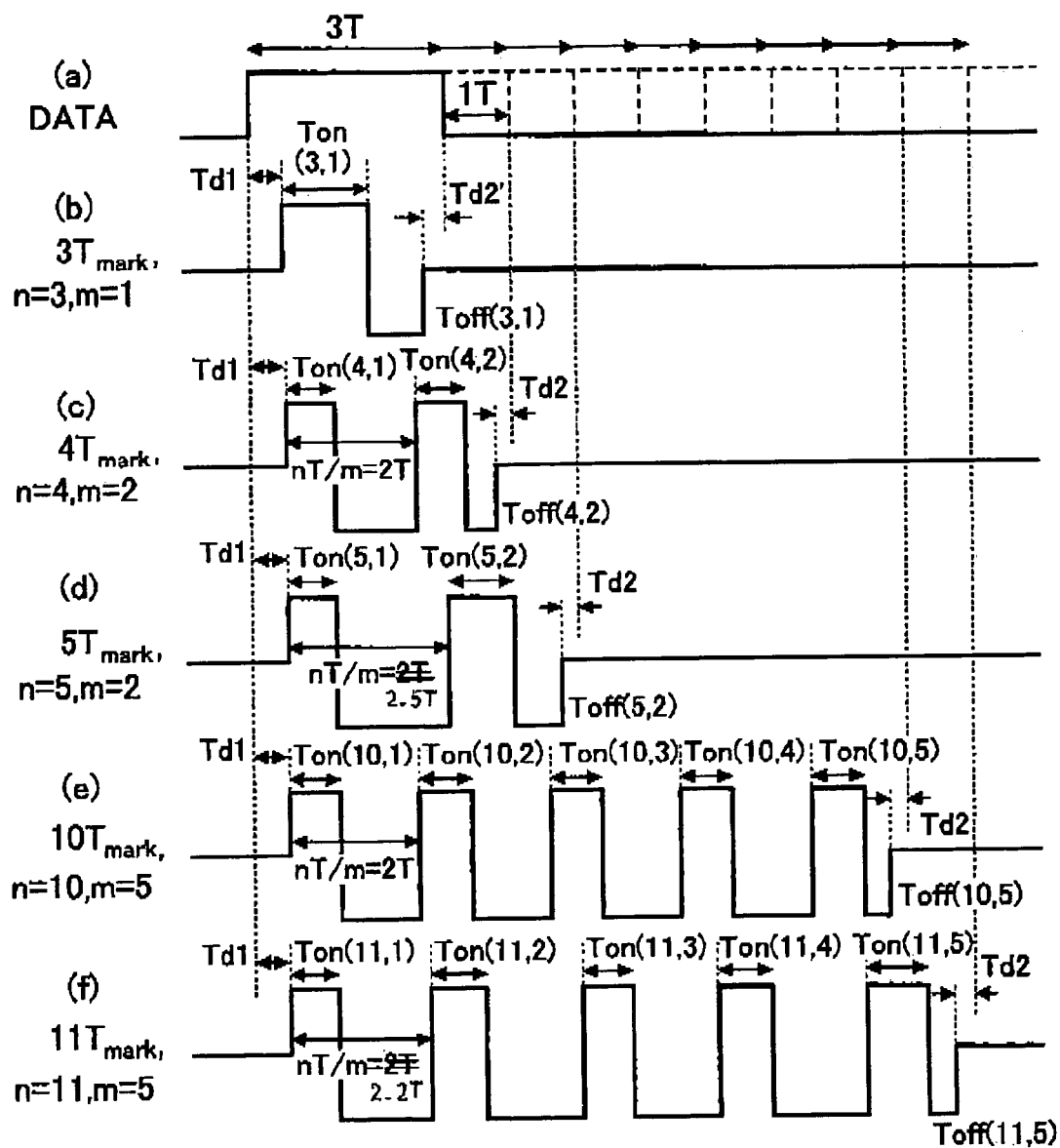
FIG. 2 is a wave form chart showing details of the cases of 3T, 4T, 5T, 10T, and 11T for considering the recording strategy.

In order to form an amorphous mark in the crystalline phase, an optical beam focused on the recording layer, or nearby thereof, is irradiated and scanned. The optical beam is intensity modulated. FIG. 1 and FIG. 2 show a luminescence waveform (recording strategy) of the intensity modulation method employed by the present embodiment. With reference to FIG. 2, (a) shows information DATA that are to be recorded. In the information recording method of the embodiment, information is recorded by a modulation method of recording mark length and space length (length of an interval between marks), which is an application of PWM (Pulse Width Modulation) to the optical information recording medium. Here, the information can be recorded by controlling the length of the recording mark and the length of the space, based on a basic clock cycle T. This modulation method realizes a recording density that is higher than the mark position modulation method, which is one of the recording methods of an optical information recording medium; and is the modulation method employed by optical disks, such as EFM adopted by CD and DD (Double Density) CD, and EFM+ adopted by DVD. In the recording mark length and the space length modulation method, it is important to precisely control the recording mark length and the space length. In the modulation method, the recording mark length and the space length are defined as n times the length of the basic clock T, that is, nT, where n is a natural number.

FIG. 1 and (a) of FIG. 2 show the case of EFM or EFM+ as an example, that is, n is 3 through 11, and 14; and the horizontal axis represents time length, and the vertical axis represents the DATA, a high level representing a recording mark in (a) of FIG. 2. In FIGS. 2, (b), (c), (d), (e) and (f) show the recording strategy in the cases where n=3, 4, 5, 10, and 11, respectively, with the vertical axis representing the intensity (irradiation power) P of the optical beam that is irradiated. The intensity of the optical beam takes three values, namely, Pw, Pe, and Pb, where Pw>Pe>Pb. Here, Pw is recording power, Pe is erasing power and Pb is bias power. If an optical beam is irradiated at P=Pe, the phase-changing recording layer takes a crystalline state. That is, a mark is erased (i.e., a space is recorded). On the other hand, if the optical beam is irradiated at P=Pw, and then, at P=Pb, the phase-changing recording layer becomes amorphous. That is, a recording mark is formed. Although Pw, Pe, and Pb are determined from the thermal characteristic and the optical characteristic of recording phase-changing material used by the information recording medium, it is desirable that the erasing power Pe be in a range of 0.2 Pw–0.6 Pw, and the bias power Pb be in a range of 0–0.1 Pw.

The recording strategy of the present embodiment uses m on-pulses (P=Pw) and m off-pulses (P=Pb) in order to record a recording mark of the time length nT. Relations between n and m are as follows. When n is an even number $n_1$, $n_1$ should equal to 2m; and when n is an odd number $n_2$, $n_2$ should equal to 2m+1. That is, every time the time length nT is extended by 2T, one each of the on-pulse (Pw) and the off-pulse (Pb) are added to the multi-pulse for forming the recording mark. Here, width (an irradiation period) of the i-th pulse (i=1 through m) that takes P=Pw when forming the mark of the time length nT is expressed by $T_{on}(n, i)$. As compared with the conventional technology that uses the recording strategy of m=n−1 as used by CD-RW, DVD-RW, and DVD+RW, the pulse-width (period) of the present embodiment is approximately twice as long. For this reason, a longer $T_{on}/T$ becomes available. Therefore, influence of the rising time and falling time of Power P (Pw/Pe/Pb) can be made relatively low, and high-speed recording with a short basic clock period T can be realized.

Although the range of the irradiation period $T_{on}$ can be determined freely, the range between 0.5T and 1.5T is desirable. If $T_{on}$ is set shorter than 0.5T, that is, the irradiation period is too short, energy given to the recording layer is insufficient, and the dimensions (in the scanning direction and perpendicular direction thereof) of a recording mark become small. As a result, the amplitude of a recording signal becomes low, and the degree of modulation will fall, resulting in a medium with low reproduction reliability. Conversely, if the irradiation period $T_{on}$ is set longer than 1.5T, the period of power P=Pb (i.e., off-pulse) being applied becomes relatively short, and availability of sudden cooling is degraded, and partial re-crystallization takes place. Therefore, although energy is sufficiently given to the recording layer, the recording mark becomes small by re-crystallization. Further, since the total amount of energy applied to the medium becomes large, thermal damage occurs in and near the recording layer, and reliability is degraded, as the number of times of recording and rewriting (overwriting) increases.

Figure 3:
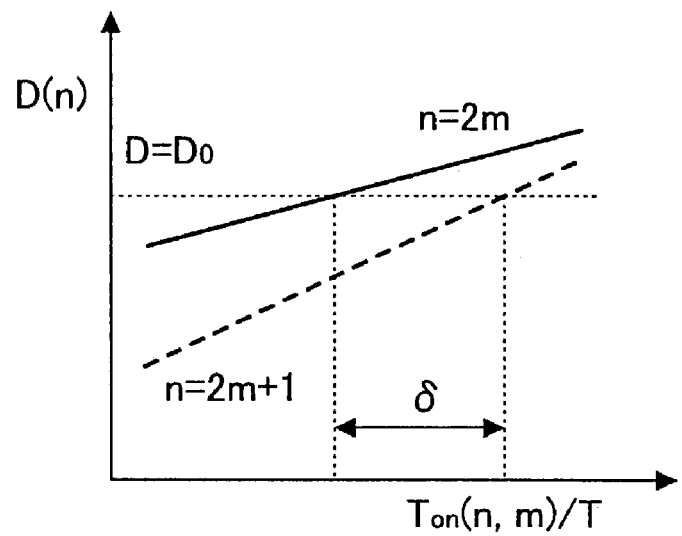
FIG. 3 shows relations between $T_{on}(n, m)$ and mark deviation D(n)

In this strategy, the irradiation period of the m-th pulse, i.e., $T_{on}(n, m)$ has a dominant influence on the length of the mark recorded. Especially, in the case of n=$n_2$ (odd number), the influence becomes more remarkable. The relations between $T_{on}(n, m)$ and mark deviation, which is the amount of variance of the mark length, are shown in FIG. 3. The mark deviation D(n) is expressed by D(n)=L(n)−nT, where L(n) represents reproduced mark length. That is, when D(n)=0, the reproduced mark length (actual recording mark length) is equal to logical mark length, that is, it can be called a good recording mark. When n is an odd number (n=2m+1), the D dependency on $T_{on}(n, m)$ is greater than the case where n is an even number (n=2m). This originates from using the same number m of pulses when recording both mark length of $n_1T$ and $n_2T$. The $n_2T$ mark should be longer than the $n_1T$ mark by 1T, and it is necessary to compensate for the difference by adjusting the irradiation period of the last pulse, and the cycle of the pulse.

Figure 4:
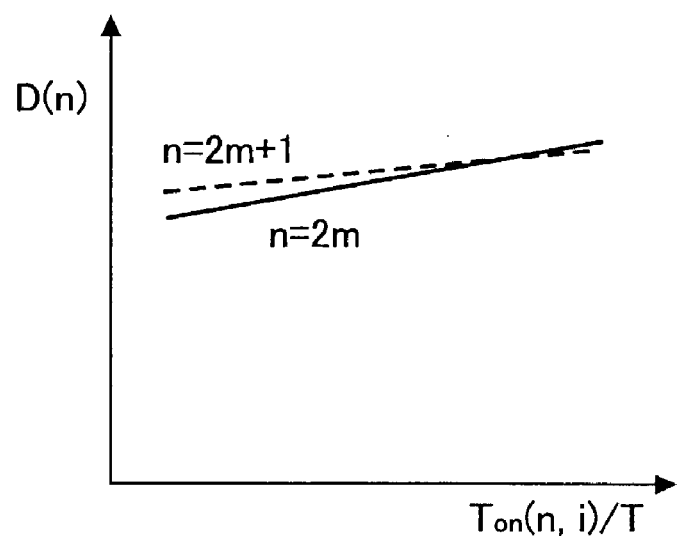
FIG. 4 shows relations between $T_{on}(n, i)$ other than the last pulse, and mark deviation D(n)

It is known that pulse irradiation period of pulses other than the last pulse does not greatly influence the length of a recording mark. The deviation dependency on a pulse width (other than the pulse width of the last pulse, i.e., the m-th pulse) is shown in FIG. 4. The deviation is small whether the number n is an odd number (n=2m+1) or an even number (n=2m), and there is no clear difference between the odd number and the even number. Accordingly, the recording strategy concerning the irradiation period $T_{on}$ of the pulses other than the last, i.e., the m-th pulse, can be unified (made to be the same), regardless of the number n being odd or even.

That is, where 1<=i<=m−1, it is possible to express $T_{on}(n_1, i)=T_{on}(n_2, i)$ Furthermore, when two or more pulses are used, that is, in the case of m>=2 and n>=4, all the pulses can be unified, not having to depend on n or i. Namely, $T_{on}(n, i)=T_{mp}$ (a constant), where n>=4, and 1<=i<=m−1. The constant $T_{mp}$ is desirable to fall within a range between 0.5T and 1.5T.

Furthermore, when n is an even number $n_1$, the last pulse also has little influence on the recording mark. Therefore, the m-th pulse $T_{on}(n_1, m)$ can be defined as $T_{on}(n_1, m)=T_{mp}$, with no regard to $n_1$. The same applies to the case of n=14, where n is an even number.

In the case that n is an odd number $n_2$, and m>=2, i.e., $n_2$>=5, the last pulse width can be unified as $T_{on}(n_2,m)=T_{1p}$, where, $n_2$>=5 and m>=2.

This is because the last pulse width dependability of D($n_2$) is independent of $n_2$, but rather, it is almost a constant. However, if $T_{on}(n_2,m)=T_{1p}$ is set at the same pulse width length as $T_{on}(n_1, m)=T_{mp}$, odd number marks always tend to be shorter than even number marks as shown in FIG. 2. Therefore, in order to arrange such that the deviation of an n1T mark is equal to the deviation of an $n_2T$ mark at $D_0$, the last pulse $T_{on}(n_2,m)=T_{1p}$ is set longer than $T_{on}(n_1, m)=T_{mp}$ by δT, namely, $T_{on}(n_2,m)=T_{on}(n_1,m)+δT$, which can also be expressed as $$T_{1p}=T_{mp}+δT.$$

As for the value of δ, while an optimum value is determined from the thermal characteristics of the recording layer of an optical information recording medium, it is desirable that the value ranges between 0 and 1.0. More desirably, the value is set between 0 and 0.5. If δ exceeds 1.0, the length of an odd number mark will become excessively long. Further, if δ exceeds 0.5, an effect of the last pulse becomes excessively great due to change of the power Pw, causing the recording power Pw dependability of mark length for an even number to greatly differ from that for an odd number, which remarkably narrows recording power margin.

Consequently, the irradiation period $T_{on}$ of all the pulses, other than the last pulse in the case n is an odd number, can be unified at $T_{mp}$.

By the way, in the recording using the mark length and the space length modulation, the space length is as important as the mark length. Concerning information expressed by two values, the mark and the space equally carry the information, and only the boundary serves a singular point. Therefore, control of the space length is as important as control of the mark length. However, if the mark length is determined, the space length is determined automatically. Distribution (variance) of the space length largely depends on mark length of the preceding mark and the subsequent mark. Specifically, the space length after a recording mark of an odd number may be different from the space length after an even number recording mark.

Optimization of both mark length and space length is carried out by controlling a gap time $T_{d1}$ and a gap time $T_{d2}$. The gap time $T_{d1}$ is a period from the data end time to the rising time of the first pulse, and the gap time $T_{d2}$ is a period from the time point when P is raised to Pe after the m-th off-pulse to the data end time. Since the influence on space jitter due to the gap time $T_{d2}$ is great, it is necessary to set up an optimum value for the gap time $T_{d2}$ for every mark length. This is because the gap time $T_{d2}$ serves as the parameter that decides the start time of a space that follows a recording mark.

In the case of a recording mark of m>=2, the time $T_{d2}$ can be unified. The range of $T_{d2}$ desirably is between −T and T. More desirably, the range is between −0.5T and 0.75T.

The gap time $T_{d1}$ also influences space jitter, however, $T_{d1}$ and $T_{d2}$ are inter-related, i.e., one is subject to the other. When optimizing $T_{d1}$ simultaneously with $T_{d2}$, $T_{d1}$ can be unified for all n. $T_{d1}$ is desired to range between 0T and 1T.

Unification of various parameters for specifying the recording strategy has so far been discussed. Concerning a 3T mark that is the shortest mark, it is necessary to uniquely set up parameters, except for the gap time $T_{d1}$. This is because the 3T mark is the only mark where m=1, and the first pulse is the last pulse, needing a strategy pattern different from m>=2. The pulse irradiation period $T_{on}(3, 1)$ is defined as $$T_{on}(3, 1) = T_{mp}'.$$

$T_{mp}'$ is optimized by the thermal characteristics and optical characteristics of the recording layer material, and further by the scanning line speed and the clock cycle at the time of recording. $T_{mp}'$ is desired to range between 0.5T and 2.0T. The gap time $T_{d2}$ for n=3 is also uniquely set up. $T_{d2}$ is to desirably range between −T and T. More desirably, the range is between −0.5T and 0.75T.

The irradiation cycle of a pulse influences the homogeneity of a mark form. If the pulse irradiation cycle is not uniform, the mark form tends to be distorted, and as a result, the signal reproduced is also distorted, and it tends to cause jitter to be worsened. This tendency becomes remarkable when the pulse irradiation period $T_{mp}$ is short, that is, the pulse width during P=Pw is small, and when the period to rise to P=Pb becomes relatively long.

Figure 5:
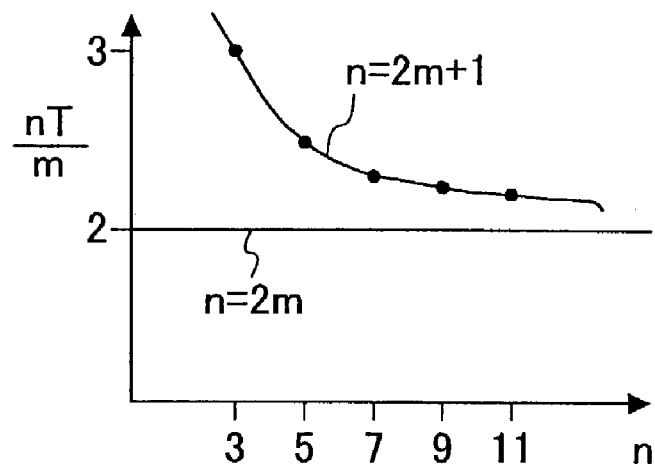
FIG. 5 shows how a pulse cycle decreases, when n is an odd number.

The pulse irradiation cycle is desired to be uniform, and more desirably the cycle is approximately equal to nT/m. Here, the pulse irradiation cycle means an average cycle and is not an individual cycle. For example, when recording a mark of nT=11T, the average cycle of the five pulses are to be set at nT/m=11T/5=2.2T, but it is not necessary to set all the pulses at 2.2. For example, the average cycle requirement (2.2T) is fulfilled by setting the first pulse and the second pulse at 2.4T, setting the cycle from the second pulse to the fourth pulse at 2.0T, and setting the cycle from the fourth pulse to fifth pulse at 2.4T. However, in order to further improve the homogeneity, it is best to set all the cycles at nT/m. Further, it is more desirable to unify the cycles, since setting up the irradiation cycle of a pulse individually means that the number of parameters that specify the recording strategy increases. Here, although a cycle in the case that n is an even number is always set to 2T, the cycle in the case that n is an odd number and five or greater becomes greater than 2T, and asymptotically approaches 2T as n becomes greater. That is, when n=5, nT/m=2.5T; when n=7, nT/m=2.3T; when n=9, nT/m=2.25T; and when n=11, nT/m=2.2T, as shown in FIG. 5.

Figure 6:
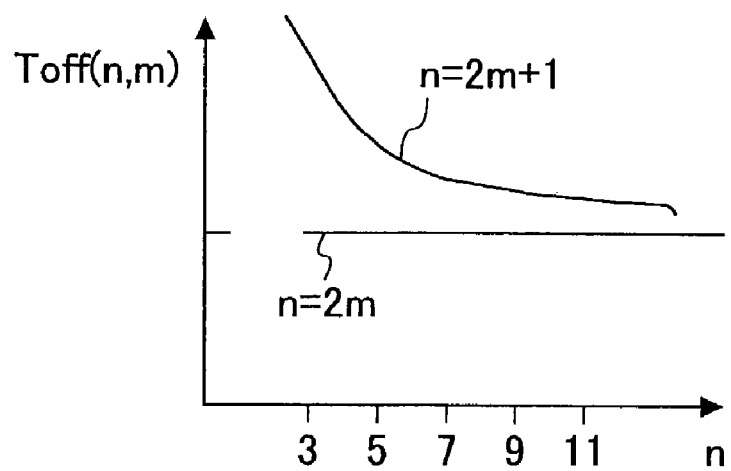
FIG. 6 shows how an irradiation period of the last off-pulse is shortened, when the n is an odd number.

Concerning the irradiation period $T_{off}(n, m)$ of the last off-pulse at power Pb applied after irradiation of the last pulse, the time $T_{d2}$ to promote the rising to the power Pe of the last off-pulse is unified as mentioned above. Accordingly, the recording strategy is such that where the number n is even, $T_{off}(n, m)$ is set at a constant independent of the value of n; and when the number n is odd, $T_{off}(n, m)$ is made such that that the irradiation period asymptotically approaches the constant in the case that the number n is even, as shown in FIG. 6.

In this manner, the optimum recording strategy used by the information recording method of the embodiment of the present invention can be described using the following six parameters.

$T_{mop}$
$T_{mp}'$
$\delta$
$T_{d1}$
$T_{d2}$ and
$T_{d2}'$.

It is evident that this method requires fewer parameters than the conventional EFM method that specifies 69 parameters, and the EFM+ method that specifies 77 parameters. Further, the time $T_{d1}$ is dependent on the time $T_{d2}$, and therefore, can be treated as a fixed value. Thus, the method of the present invention can be considered as essentially requiring only five parameters.

Other parameters such as $T_{d1}'$ that is $T_{d1}$ optionally defined for n=3; and α, a and b that will be described later may be additionally used.

Figure 7:
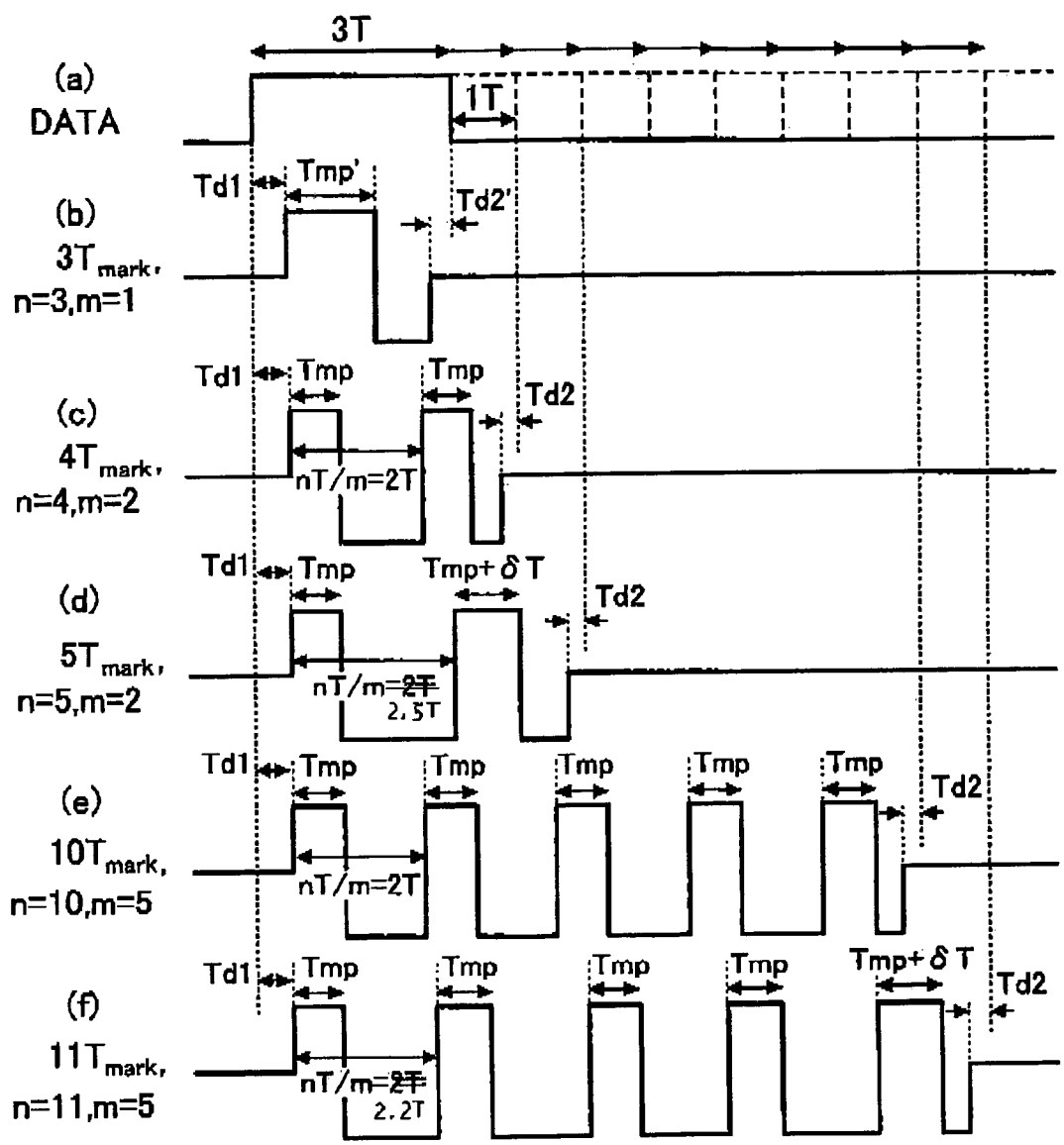
FIG. 7 is a wave form chart showing the outline of the recording strategy according to the embodiment of the present invention, wherein a fewer number of parameters are used than conventionally required.

The recording strategy specified by the above-described parameters is shown in FIG. 7.

When the recording strategy is applied to the case where the recording speed (scanning speed) is changed, the irradiation periods $T_{mp}$ and $T_{mp}'$ are adjusted according to the scanning line speed v at the time of recording. Other parameters can be set constant to a basic clock cycle T(v). That is, values $\delta/T(v)$, $T_{d1}/T(v)$, $T_{d2}/T(v)$ and $T_{d2}'/T(v)$, which are normalized by the basic clock cycle T(v), are independent of the recording speed (scanning speed), and are fixed.

The basic clock cycle T(v) is expressed by $T(v)=L_0/v$, when line density is a constant, i.e., an amount of information per unit length of the scanning direction is constant. Here, $L_0$ is equivalent to the length on the optical information recording medium corresponding to the basic clock cycle T, which generally is called "channel bit length". In the case of DVD, $L_0$ is 0.133 μm, and in the case of CD, $L_0$ is 0.278 μm or 0.324 μm. That is, when the scanning speed is doubled, the basic clock cycle T becomes ½.

When the scanning speed is changed as above, it is desirable that $T_{mp}(v)/T(v)$ and $T_{mp}'(v)/T(v)$ become small, and fulfill the following conditions, namely, the relative time in reference to the basic clock cycle $T(v)$ $$T_{mp}(v_H)/T(v_H) > T_{mp}(v_L)/T(v_L), \text{ and}$$

$$T_{mp}'(v_H)/T(v_H) > T_{mp}'(v_L)/T(v_L); \text{ and}$$

in real time, $$T_{mp}(v_H) < T_{mp}(v_L), \text{ and}$$

$$T_{mp}'(v_H) < T_{mp}'(v_L),$$

where $v_L$ represents the speed $v$ that is relatively low, and $v_H$ represents the speed $v$ that is relatively high (i.e., $v_L < v_H$)

Figure 8:
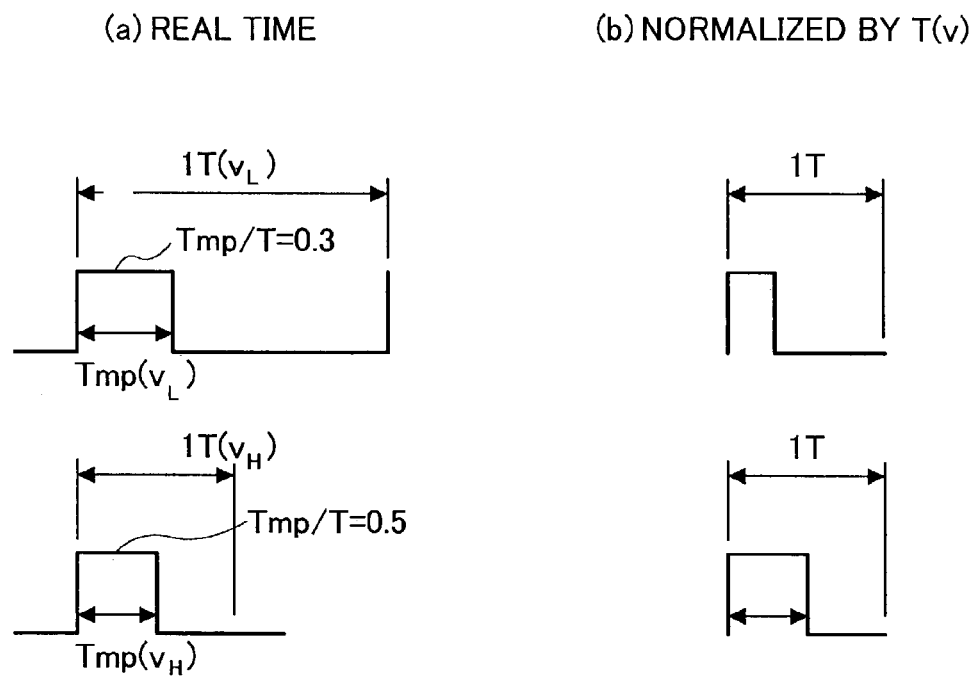
FIG. 8 is a diagram showing how duty ratios of the irradiation period change with changes of the scanning speed.

This point is explained with reference to the schematic illustration shown in FIG. 8. For explanation purpose, the following values are used, namely, $v_L=1.0$, $v_H=2.0$, $T_{mp}(v_L)=0.3$, and $T_{mp}(v_H)=0.5$. As shown at (a) of FIG. 8, $T_{mp}(v_H)$ is shorter than $T_{mp}(v_L)$ in real time. However, as shown at (b) in FIG. 8, duty ratios normalized by each basic clock cycle $T(v_L)$ and $T(v_H)$ are $T_{mp}(v_L)/T(v_L)=0.15$ and $T_{mp}(v_H)/T(v_H)=0.5$, respectively, therefore, the relation becomes as $T_{mp}(v_H)/T(v_H) > T_{mp}(v_L)/T(v_L)$. That is, the duty ratios $T_{mp}(v)/T(v)$ and $T_{mp}'(v)/T(v)$ normalized by the basic clock cycle $T(v)$ are desired to be reversed depending on the scanning speed.

Further, it is desirable that the irradiation periods $T_{mp}$ and $T_{mp}'$ be according to a function that is proportional to $\alpha = v/v_0$ that is a function of the scanning speed $v$. Here, $v_0$ represents the minimum scanning speed, at which recording can be performed on an optical information recording medium.

It is more desirable that $T_{mp}$ fulfill $T_{mp}(\alpha)/T(\alpha) = a \times \alpha + b$. Here, $\alpha$ is a real number that is equal to or greater than 1, representing a range of the scanning speed, at which recording can be performed on an optical information recording medium, and a and b are constants. For example, in the case of the CAV (Constant Angular Velocity) recording method for a disk type recording medium with a diameter of 120 mm, $\alpha$ is desirably to range between 1 and 2.4, and is more desirably to range between 1 and 4. For a specific example of CD-RW with $L_0=278$ nm and the scanning speed $v=9.6$ m/s through 38.4 m/s, equivalent to 8× through 32×, respectively ($v_0=9.6$ m/s=8×, $\alpha=1$ through 4, respectively) of the present embodiment, a and b are desired to fall in ranges below, respectively, as shown in FIG. 9.

$$0.14 <= a <= 0.29$$

$$0.2 <= b <= 0.4.$$

Figure 9:
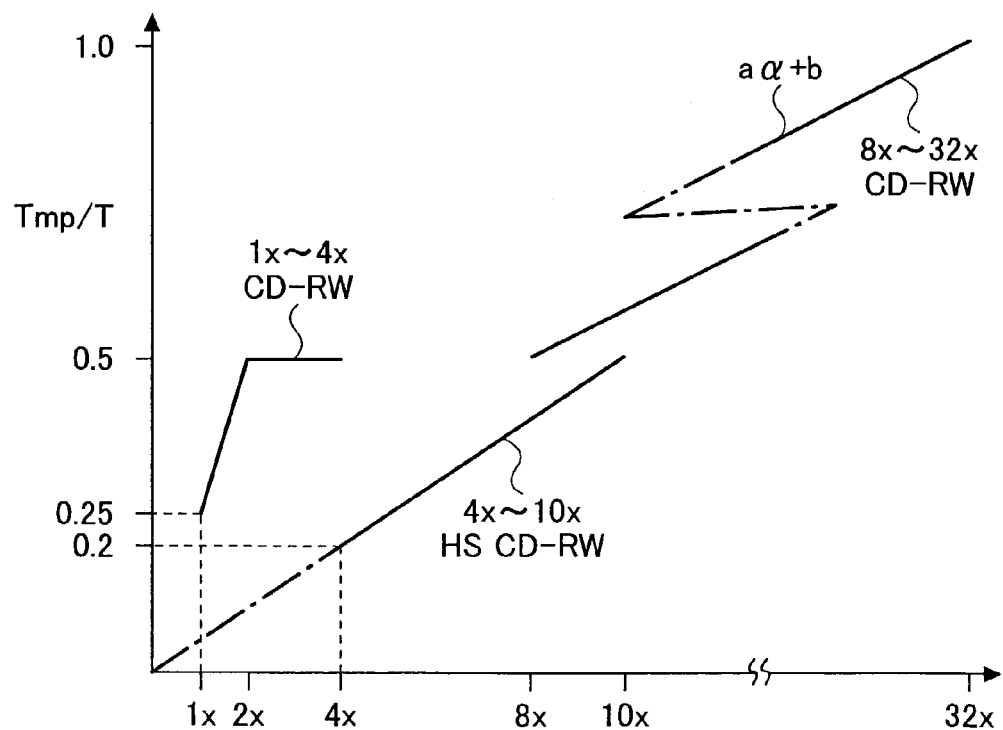
FIG. 9 shows functions that change the duty ratio of the irradiation period with changes of the scanning speed.

Incidentally, FIG. 9 also shows the duty ratio $T_{mp}/T$ characteristics of CD-RW ($v_0=1.2$ m/s, $\alpha=1$ through 4) of 1× through 4×, and HS CD-RW ($v_0=4.8$ m/s, $\alpha=1$ through 2.5) of 4× through 10×. Further, in the case of DVD+RW, $v_0=3.49$ m/s, and $\alpha=1$ through 2.4.

Although the constants a and b can be set up according to the characteristics of the optical information recording medium, it is desirable that a and b fall within the ranges, respectively, shown below.

$$0.1 <= a <= 0.4$$

$$0.1 <= b <= 0.4.$$

By setting up the constants a and b in the above manner, the recording strategy, where $\alpha$ ranges between 1 and 4, is realized.

Further, when n=3, the irradiation period $T_{mp}'$ also changes by $\alpha$; and the following formula can be used.

$$T_{mp}'(\alpha) = (T_{mp}(\alpha)/T_{mp}(1)) \times T_{mp}'(1).$$

Thus, even when $\alpha$ is changed by shortening the irradiation period $T_{mp}$ relative to the basic clock cycle T, it is possible to realize the recording method where the power Pw does not greatly change. Therefore, the method is suitably applicable to CAV recording and Z-CLV recording. Here, Z-CLV represents Zone CLV, wherein CLV recording is carried out for every radius range, resulting in quasi-CAV recording, Z-CLV, where the radius range takes the limit value of 0, is the same as the CAV recording. (The pre-format to an optical information recording medium)

As mentioned above, the recording method consisting of a complicated recording strategy can be specified with a small number of parameters. By pre-formatting the information representing the parameters to an optical information recording medium, an information recording apparatus is able to set up accurate recording conditions by reading the information representing the parameters from the optical information recording medium.

The embodiment is characterized by, among other things, pre-formatting of the information that represents the parameters on the optical information recording medium.

Any technique may be used for the pre-formatting. Examples of the pre-formatting include the pre-pit method, the wobble encoding method, and the formatting method. The pre-pit method is the technique of pre-formatting the information about recording conditions using a ROM pit in a desired domain of an optical information recording medium. Since the ROM pit is formed at the time of substrate fabrication, it excels in mass-production properties; and since the ROM pit is used, it is advantageous in respect of reproduction reliability and the amount of information. However, the technology (namely, hybrid technology) for forming the ROM pit has various problems, and pre-formatting by pre-pit of an RW system is considered difficult.

The formatting method records the information using the same technique as the usual recording using an optical information recording apparatus. However, this technique needs formatting of each medium after manufacturing of the recording medium, and therefore, productivity is not high. Furthermore, the pre-formatted information can be rewritten, which is not a desirable feature as the technique for recording the information that is peculiar to a medium.

The wobble encoding method is a technique actually adopted by CD-RW and DVD+RW systems. This technique is used when encoding address information on an optical information recording medium, and is carried out by wobbling a groove (guide groove on the medium). As for the encoding technique, frequency modulation as used by ATIP of CD-RW, and phase modulation as used by DVD+RW may be used. Since the wobble encoding method does not require forming of a special ROM pit, which is the case with the pre-bit method, it excels in productivity. Further, since the information representing the parameters is arranged simultaneously with the address information by the wobble encoding method on the substrate at the time of substrate fabrication of the optical information recording medium, the productivity is high.

Figure 10:
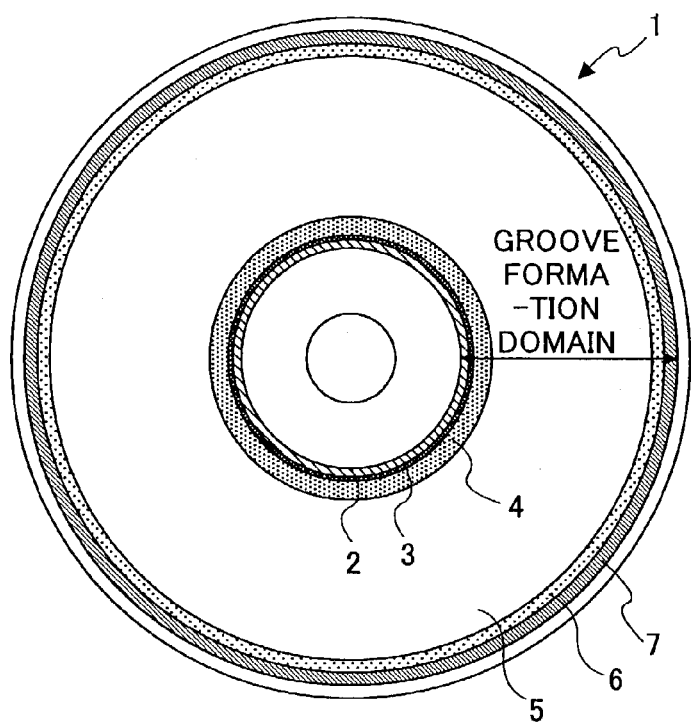
FIG. 10 is a plane drawing showing domain assignments of the optical information recording medium.
Figure 11:
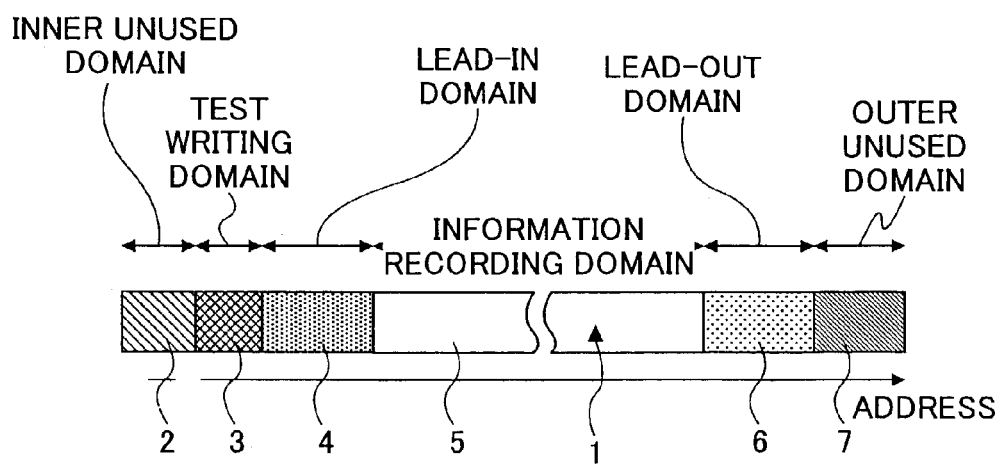
FIG. 11 is a cross-sectional drawing showing the domain assignment of the optical information recording medium.

Now, the pre-formatting of the information representing the parameters for structuring the recording strategy mentioned above will be explained, taking the case of a CD-RW for example. According to the CD-RW standard, various domains of the optical information recording medium 1 are formatted as shown in FIG. 10 and FIG. 11. The optical disk information recording medium 1 includes a groove formation domain that further includes an inner periphery unused domain 2, a test recording domain 3, a lead-in domain 4, an information recording domain 5, a lead-out domain 6, and an outer unused domain 7, which are located in this sequence from inside to outside.

In the case of the optical information recording medium 1, which is a CD-RW in this embodiment, the media information that is pre-formatted is ATIP Extra Information. The ATIP Extra Information is an expansion of the ATIP that defines the address information, and is pre-formatted on the CD-RW disk. The address information is expressed as time information by the definition of the CD disk. Specifically, the address information is expressed by M:S:F, where, M represents minutes, S represents seconds, and F represents frames. M ranges between 00 and 99, S ranges between 00 and 59, and F ranges between 00 and 74. A minute is defined as 60 seconds; and a second is equivalent to 75 frames, according to the standard. Since 8 bits are assigned to each of M, S, and F, the total of 24 bits are contained in an ATIP frame. Although a value between 0 and 255 may be assigned to each 8 bits of M, S, and F, only the above-mentioned ranges are used in fact. For this reason, extra information, in addition to the address information, can be expressed by using the values outside of the above-mentioned ranges. The technique of the ATIP Extra Information uses the unused values.

Figure 12:
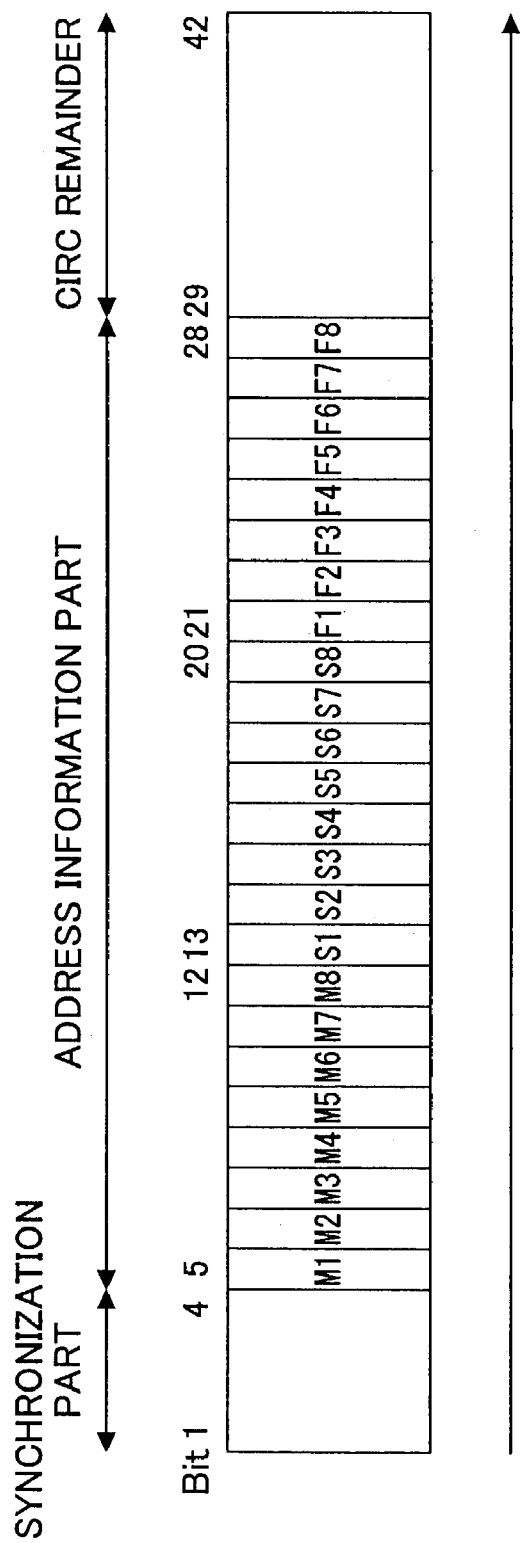
FIG. 12 shows the data format of an ATIP frame.

The data format of the ATIP frame consists of 42-bit information as shown in FIG. 12. The first 4 bits constitute a synchronization part, indicating the start of a frame. The synchronization part consists of a special pattern so that an information recording apparatus can recognize the start of a frame for reproducing the ATIP. Then, following the synchronization part, the above-mentioned address information part consisting of 24 bits is located, occupying the 5th through 28th bit positions. The address information part is divided into three parts each having 8 bit positions, the positions M1 through M8 being for M (minutes), the positions S1 through S8 being for S (seconds), and the positions F1 through F8 being for F (frames) of the address information. The remaining 14 bits occupying the 29th through 42 bit positions, following the address information part, are called "CIRC Remainder", which are used for error correction using CIRC (Cross Interleaved Reed-Solomon Code).

The standards of CD-RW define seven kinds of the contents of the address information part, according to the combination of M1, S1, and F1 of the address information, as follows.

(M1, S1, F1)=or (0, 0, 0) or (1, 0, 0) an ordinary address
(M1,S1,F1)=(1,0,1):Special Information-1
(M1,S1,F1)=(1,1,0):Special Information-2
(M1,S1,F1)=(1,1,1):Special Information-3
(M1,S1,F1)=(0,0,1):Additional Information-1
(M1,S1,F1)=(0,1,0):Additional Information-2
(M1,S1,F1)=(0,1,1):Additional Information-3

Pieces of the information listed above, except for the ordinary address, are used as ATIP Extra Information. The ATIP Extra Information contains information peculiar to the disk, such as information about the kind of the disk, recording conditions (e.g., parameters for setting up recording power and the optimum recording power; and parameters for specifying the recording strategy).

The ATIP Extra Information is stored in the lead-in domain 4 of the optical information recording medium 1, and after nine frames of ordinary addresses continue, a frame of ATIP Extra Information is inserted. That is, in order to reproduce the six kinds of the ATIP Extra Information, at least 60 frames need to be reproduced.

Here, as parameters for specifying the recording strategy of the information recording method of the present embodiment, six normalized parameters are adopted, namely, $T_{d1}/T$, $T_{d2}/T$, $T_{d2}'/T$, $T_{mp}/T$, $T_{mp}'/T$ and $\delta/T$, which are normalized by the basic clock cycle T. Information representing the parameters is to be pre-formatted on the optical information recording medium 1. The information is to be placed into Additional Information-1 of the ATIP Extra Information.

Figure 13:
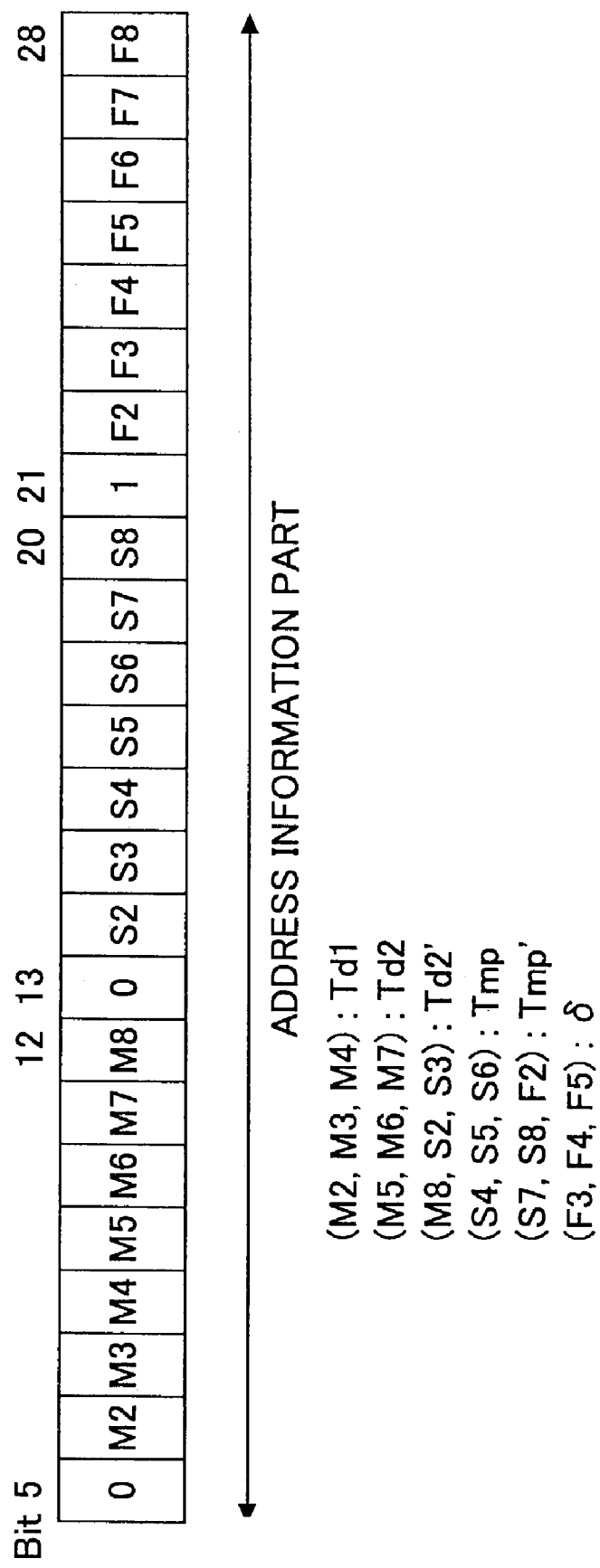
FIG. 13 shows address assignments of pre-formatting the parameters in the address information part.

Since M1, S1, and F1 are fixed to 0, 0, and 1, respectively, specifying that it is Additional Information-1, the parameters are stored in the address information part as shown in FIG. 13. Specifically, the parameters are expressed by bit positions as follows.

(M2,M3,M4):$T_{d1}/T$ (M5,M6,M7):$T_{d2}/T$ (M8,S2,S3):$T_{d2}'/T$ (S4,S5,S6):$T_{mp}/T$ (S7,S8,F2):$T_{mp}'/T$ (F3,F4,F5):$\delta/T$ In this example, 3 bits are given to each of the parameters. That is, eight levels of information can be given to every parameter. Relations between bit combinations and parameter values (real numbers) are predetermined by using conversion tables 11a through 11f shown in FIG. 15 through FIG. 20, respectively.

Now, suppose that optimum parameter values of a certain optical information recording medium 1 are as follows.

$T_{d1}/T=0.50$ $T_{d2}/T=0.00$ $T_{d2}'/T=0.25$ $T_{mp}/T=1.00$ $T_{top}'/T=1.60$ $\delta/T=0.14$.

Each value is converted to a bit sequence using the conversion tables 11a through 11f shown in FIG. 15 through FIG. 20, respectively, as follows.

(M2,M3,M4)=(0,1,1)

(M5,M6,M7)=(1,0,0)

(M8,S2,S3)=(1,0,1)

(S4,S5,S6)=(1,0,0)

(S7,S8,F2)=(1,0,1)

(F3,F4,F5)=(0,1,0).

Figure 14:
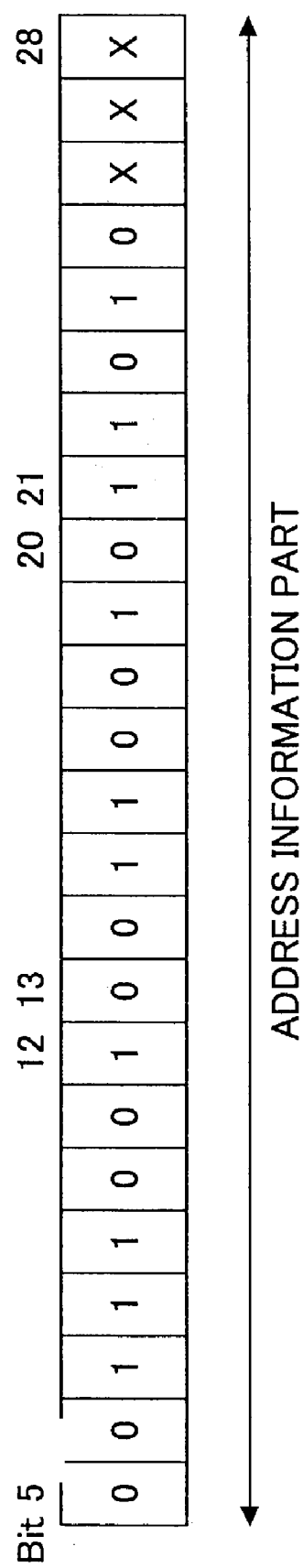
FIG. 14 shows an example of bit information that is pre-formatted.

Accordingly, the bit sequence that expresses the optimum parameters, which is to be pre-formatted as Additional Information-1 becomes as shown in FIG. 14 (here, X signifies an undefined bit position, where either 0 or 1 may be inserted).

As mentioned above, when an optical information recording medium that has a different set of optimum parameters is to be used, such parameters are to be converted to a bit sequence using the conversion tables 11a through 11f such that Additional Information-1 is set up accordingly.

By the way, the wobble encoding technique tends to provide an information capacity that is smaller than other techniques. Usually, the wobble frequency is set at a frequency band where interference does not occur with the information to be recorded. The wobble frequency is usually set at 1/30 or less, more preferably, 1/100 or less, of the frequency for information recording. Where frequency modulation is used, the information density is further decreased. Furthermore, where the redundancy of the address information is used as in the ATIP Extra Information of CD-RW, the information density is further decreased.

Where the information capacity runs short, a new domain may be used. In CD-RW, the ATIP Extra Information is encoded in the lead-in domain 4. When the capacity runs short in this domain, the inner periphery unused domain 2, and the outer unused domain 7 may be used. Examples of the unused domains 2 and 7 are the inside of the test recording domain 3 (PCA: Power Calibration Area) and the outside of the lead-out domain 6, respectively.

Further, like the example mentioned above, the parameters to be encoded may be binary values converted from real numbers, and may use a conversion table. In either case, an information recording apparatus is required to be capable of decoding the encoded information such that recording strategy can be properly set up.

(The Recording Strategy Generation Method)

The information recording apparatus corresponding to the optical information recording medium 1, which is a CD-RW, reproduces the ATIP Extra Information at the time of recording to the optical information recording medium 1. The information recording apparatus should be capable of reading the Additional Information-1, and prepared with a conversion table for changing the bit information into real numbers. The information recording apparatus reproduces the Additional information-1, and acquires each bit value from the optical information recording medium 1. Then, the conversion tables 11a through 11f are used to convert the bit information into real numbers for reproducing the parameters. The information recording apparatus can set up the optimum recording strategy based on the real numerical values of the parameters. Since the optimum parameters that may be peculiar to each optical information recording medium 1 are pre-formatted as the Additional information-1 in the optical information recording medium 1, the information recording apparatus can properly set up the optimum recording strategy for the optical information recording medium 1.

Figure 21:
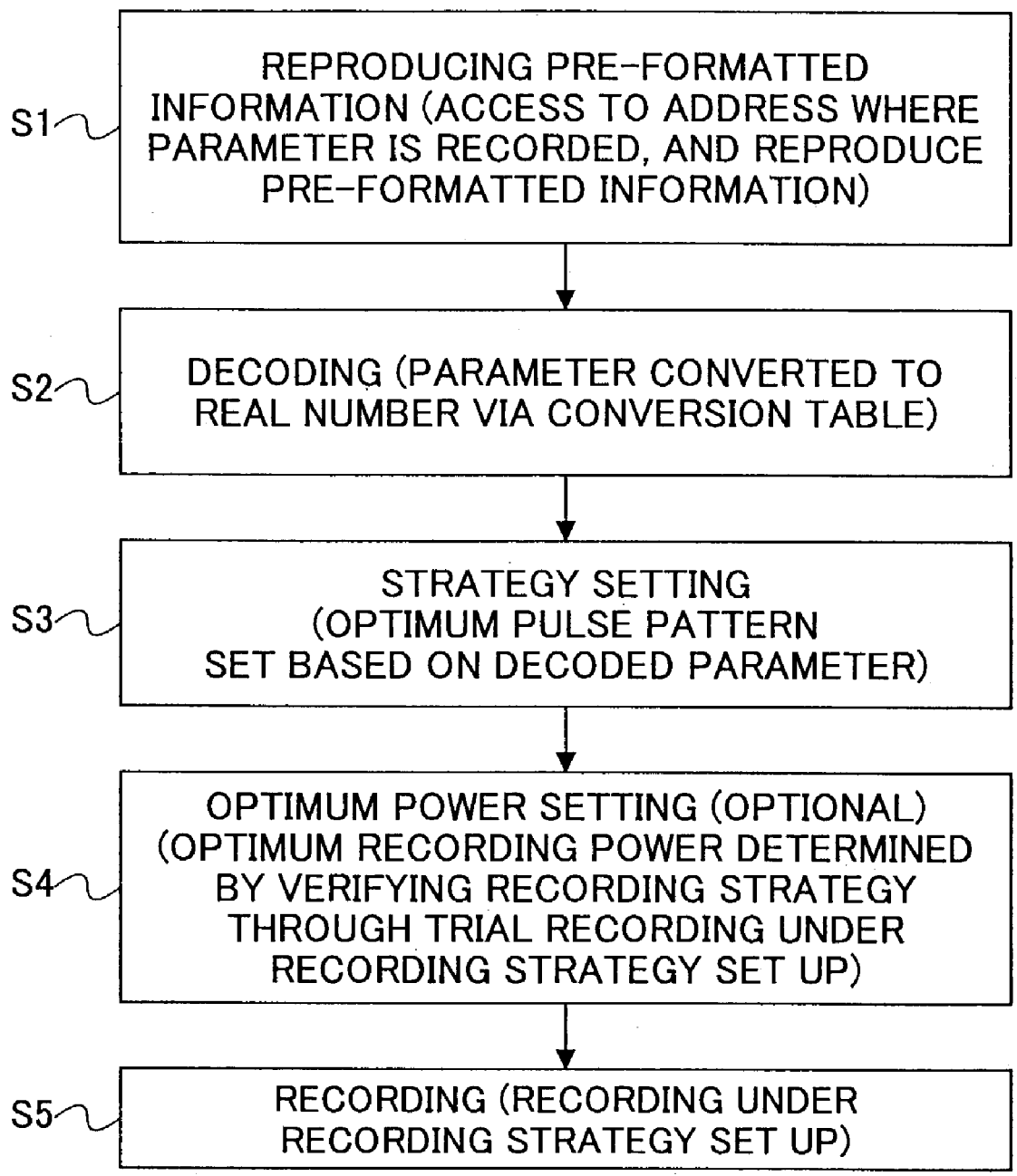
FIG. 21 is a flow chart showing an outline of the recording strategy generation process.

FIG. 21 is a flowchart explaining a process for generating the recording strategy. The process is performed by a system controller, which will be described later, of the information recording apparatus.

First, in advance of the recording operation, the pre-formatted information is reproduced from the target optical information recording medium 1 that is mounted on the information recording apparatus (Step S1). That is, access is made to the addresses at which the parameters $T_{d1}/T$, $T_{d2}/T$, $T_{d2}'/T$, $T_{mp}/T$, $T_{mp}'/T$, and $\delta/T$ are recorded, and the pre-formatted information is reproduced. The re-produced information, which is bit information of the parameters, is decoded (S2). Then, the conversion tables 11a through 11f are used for converting the bit information into real numbers, namely, $T_{d1}$, $T_{d2}$, $T_{d2}'$, $T_{mp}$, $T_{mp}'$, and $\delta$, which represent the parameter values; and the recording strategy is generated and set up so that the optimum multi-pulse pattern is generated using the converted parameter values (S3). Then, the optimum recording power may be set up as required (S4), which is a trial writing for verifying the recording strategy thus set up, and for setting up the optimum recording power. For the trial writing, the OPC (Optimum Power Control) adopted by CD-R/RW and DVD+RW/R systems may be used. Then, recording is performed (S5) based on the recording strategy using the recording power determined in this manner.

Information Recording Apparatus

Figure 22:
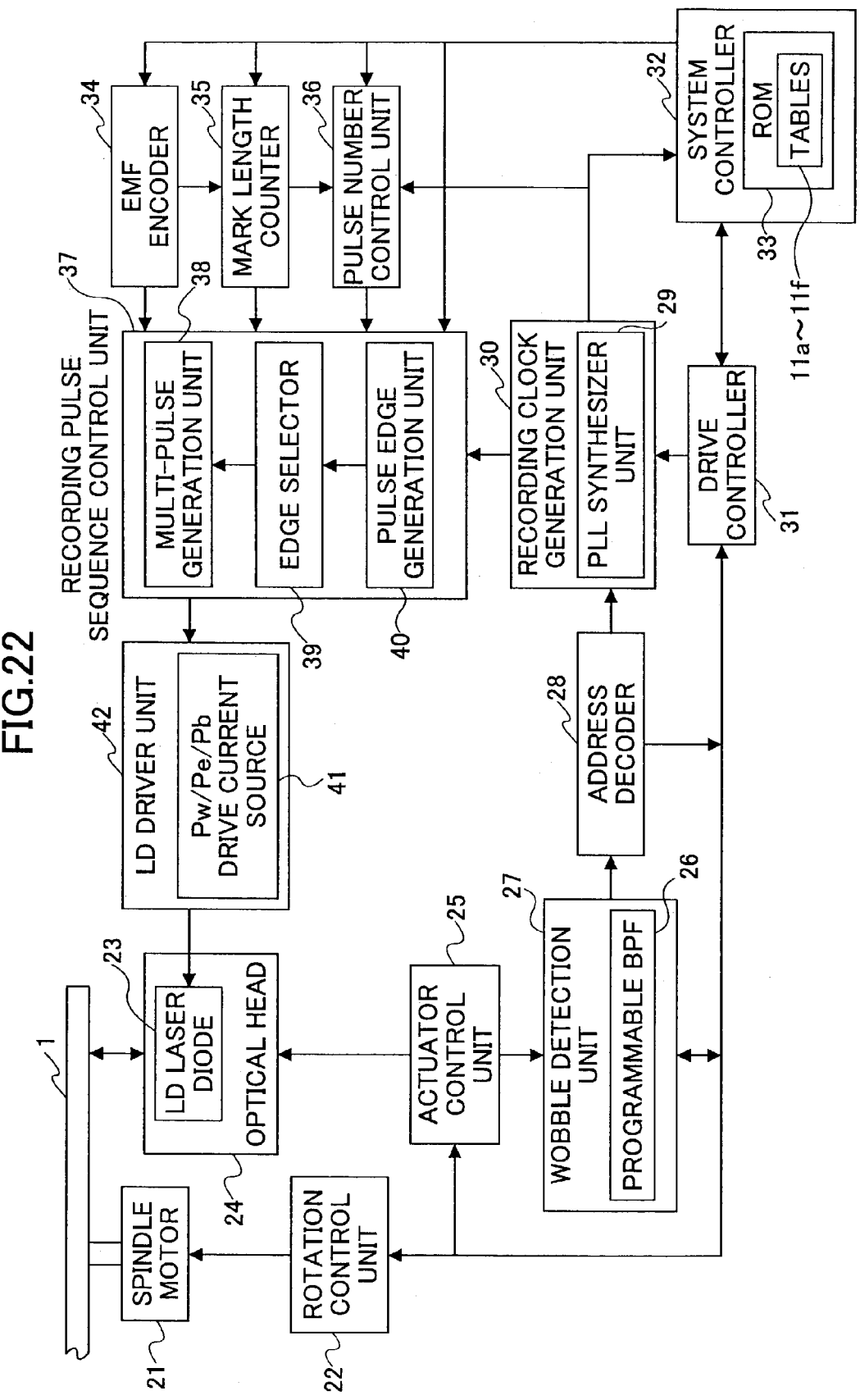
FIG. 22 is an outline block diagram showing a configuration example of an information recording apparatus.

Next, an example of the structure of the information recording apparatus that realizes the information recording method based on the recording strategy mentioned above is explained with reference to FIG. 22. The information recording apparatus includes a spindle motor 21, a rotation control unit 22, a laser diode (LD) 23, an optical head 24, an actuator control unit 25, a programmable BPF 26, a wobble detection unit 27, an address decoder 28, a PLL synthesizer 29, a recording clock generation unit 30, a drive controller 31, a system controller 32, a ROM 33, conversion tables 11a through 11f, an EMF encoder 34, a mark length counter 35, a pulse number control unit 36, a recording pulse sequence control unit 37, a multi-pulse generation unit 38, an edge selector 39, a pulse edge generation unit 40, a Pw/Pe/Pb driving current source 41, and an LD driver unit 42.

An optical information recording medium 1 (also called a disk), a CD-RW in this example, is rotated by the spindle motor 21 that is controlled by the rotation control unit 22. The optical head 24 includes the laser diode LD 23, irradiating a laser beam, and an object lens for focusing the laser beam from LD 23 on the optical information recording medium 1, the optical head 24 being arranged seek-movement free in the direction of the disk radius. The actuator control unit 25 is connected to a driving unit for the object lens and an output system of the optical head 24. The wobble detection unit 27 containing the programmable BPF.26 is connected to the actuator control unit 25. The address decoder 28 is connected to the wobble detection unit 27 such that an address is decoded from a wobble signal provide by the wobble detection unit 27. The recording clock generation unit 30 including the PLL synthesizer circuit 29 is connected to the address decoder 28. The drive controller 31, serving as a speed control means, is connected to the PLL synthesizer 29.

The rotation control unit 22, the actuator control unit 25, the wobble detection unit 27, and the address decoder 28 are also connected to the drive controller 31 that is further connected to the system controller 32.

The system controller 32 includes a CPU, the ROM 33 that further includes the conversion tables 11a through 11f, and other components. Further, the EFM encoder 34, the mark length counter 35, and the pulse number control unit 36 are connected to the system controller 32. The recording pulse sequence control unit 37, serving as a luminescence waveform control means, is connected to the EFM encoder 34, the mark length counter 35, the pulse number control unit 36, and the system controller 32. The recording pulse sequence control unit 37 includes the multi-pulse generation unit 38 for generating a multi-pulse (an on-pulse and an off-pulse) as specified by the recording strategy, the edge selector 39, and the pulse edge generation unit 40.

The LD driver unit 42 is connected to the output side of this record pulse sequence control part 37. The LD driver unit 42, serving as an optical beam source drive means, supplies recording power Pw, erasing power Pe, and bias power Pb, one at a time, to the semiconductor laser LD 23 in the optical head 24 by switching the Pw/Pe/Pb driving current source 41.

Recording to the optical information recording medium 1 by the structure as described above is carried out as follows. The number of rotations of the spindle motor 21 is controlled by the rotation control unit 22 that is further controlled by the drive controller 31 so that a desired line speed is obtained. The programmable BPF 26 detects and separates a wobble signal from a push-pull signal acquired from the optical head 24. From the wobble signal, an address is decoded, and the PLL synthesizer 29 generates a recording channel clock. Next, in order to generate the recording pulse sequence by the semiconductor laser LD 23, the recording channel clock and EFM data that are the data to be recorded are supplied to the recording pulse sequence control unit 37. The multi-pulse generation unit 38 in the recording pulse sequence control unit 37 generates the multi-pulse that is in accordance with the recording strategy as shown in FIG. 7. LD luminescence waveforms according to the recording pulse sequence can be obtained by the LD driver unit 42 switching the Pw/Pe/Pb current source 41 so that the above-mentioned irradiation powers Pw, Pe, and Pb are obtained.

In the present embodiment, the pulse edge generation unit 40 that contains a multiple stage delay circuit with a resolution of $\frac{1}{20}$ of the recording channel clock cycle is included in the recording pulse sequence control unit 37. The pulse edge generation unit 40 generates a rising control signal for the first pulse, and the like, based on an edge pulse selected by the system controller 32 based on the parameter $T_{d1}$, and provided to the edge elector (multiplexer) 39. The multi-stage delay circuit of the pulse edge generation unit 40 can be configured by a high resolution gate delay element, and a ring oscillator plus a PLL circuit.

Based on the rising control signal for the first pulse, which is generated in the manner as described above, a multi-pulse sequence that is in sync with the standard clock cycle T is generated based on the parameters $T_{mp}$, $T_{mp}'$, δ, and a cycle nT/m, etc. As for the irradiation period $T_{off}(n, m)$ for the last off-pulse, the rising control signal for the last off-pulse, and the like are generated based on an edge pulse selected by the system controller 32 based on the parameter $T_{d2}$ or $T_{d2}'$, as applicable.

Further, the recording pulse sequence control unit 37 of the present embodiment generates the multi-pulse in the following manner. The mark length counter 35 calculates the mark length of the EFM signal acquired from the EFM encoder 34. Whenever the mark count value increases by 2T, the pulse number control unit 36 generates a set of pulses (the on-pulse of Power Pw and off-pulse of Power Pb).

This operation is made possible by selecting the front edge of the following multi-pulse by the edge pulse generated from the following record channel clock cycle, and selecting the rear edge of the multi-pulse by the pulse edge generated from the following record channel clock cycle, after choosing the rear edge of the first pulse by the edge selector 39.

An alternative configuration of the multi-pulse generation unit may be as follows. A divided recording clock is generated by dividing the recording channel clock by two. An edge pulse is generated using a multi-stage delay circuit. By selecting the front edge and the rear edge by using an edge selector, a set of pulses (an on-pulse at power Pw and off-pulse at power Pb) is generated, every time the recording channel clock is increased by 2T. In this configuration, the operating frequency of the multi-pulse generation unit substantially becomes one half, providing a higher-speed recording operation.

MODIFICATIONS

Figure 23:
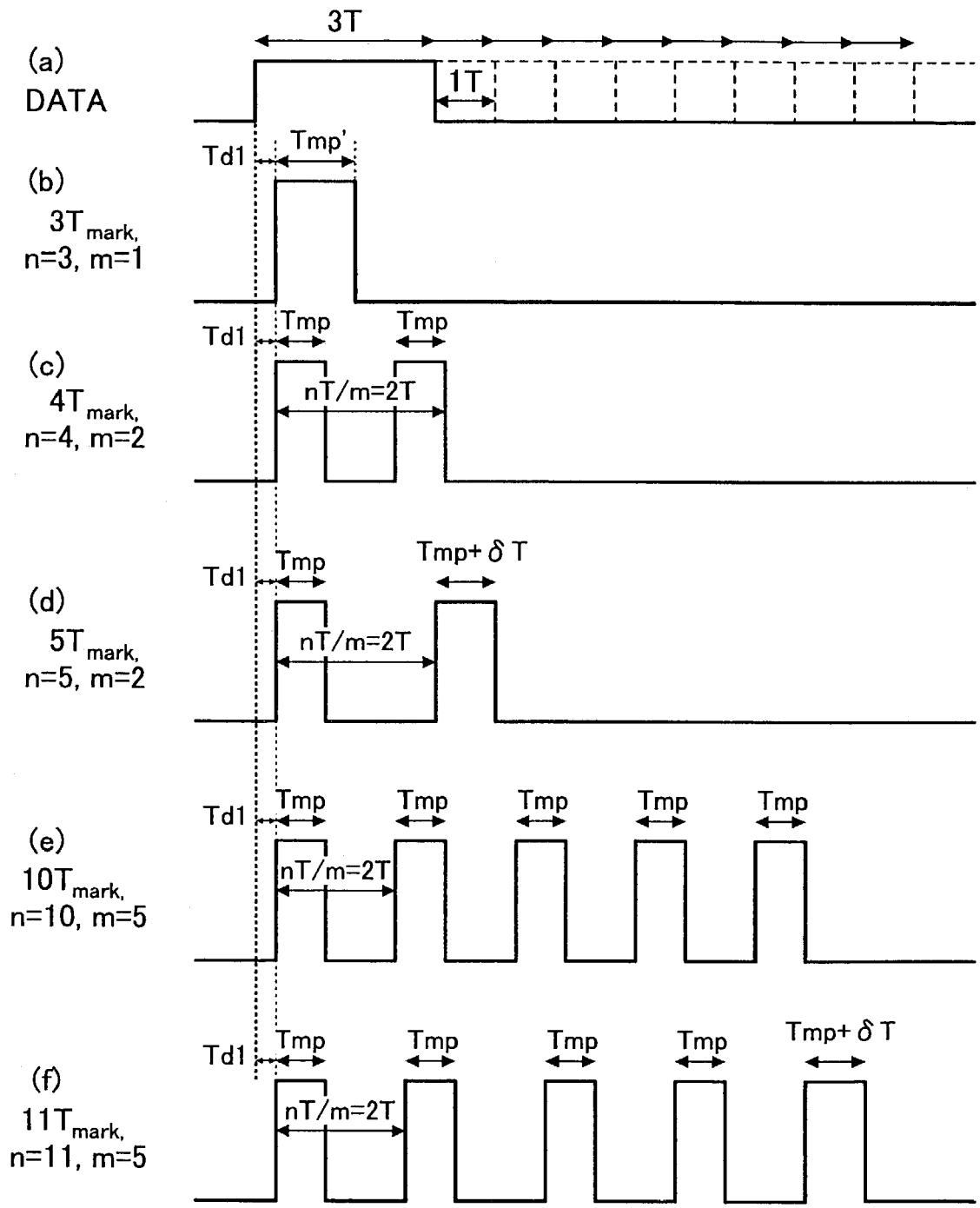
FIG. 23 is a wave form chart showing an outline of a variation of the recording strategy.
Figures 24A, 24B, 24C, 24D:
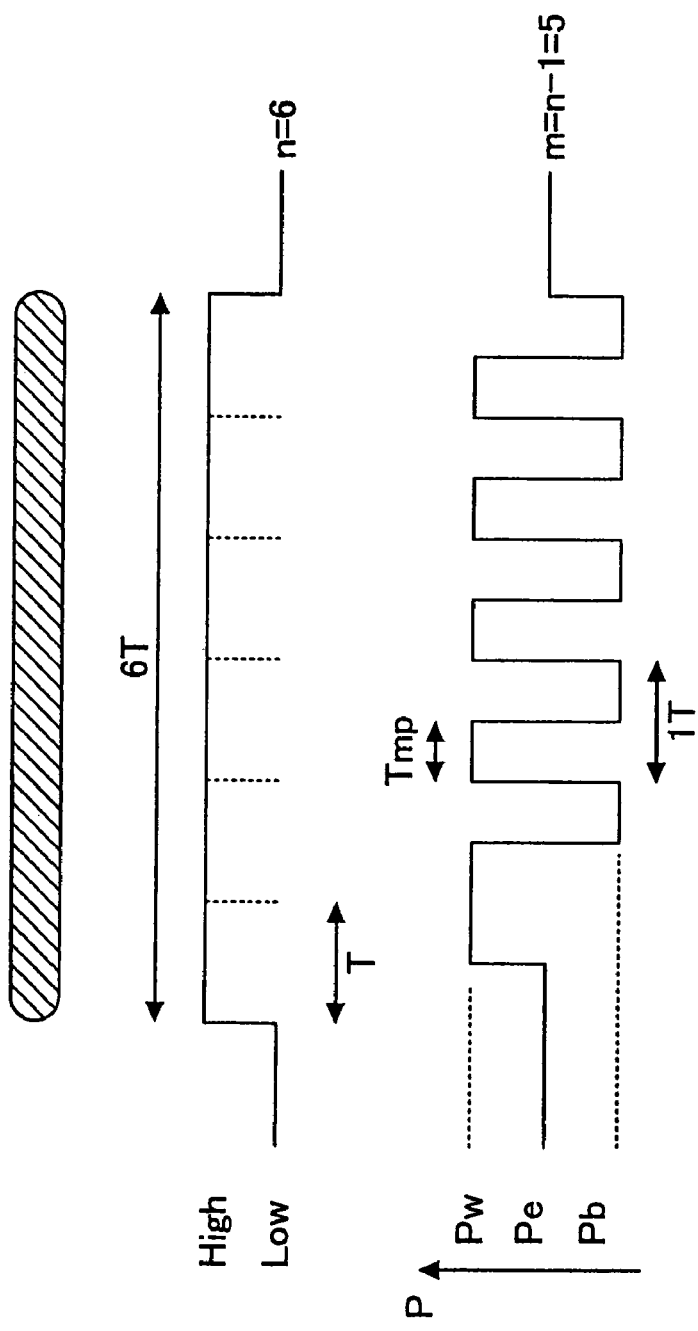
FIGS. 24A through 24D are wave form charts showing an outline of the recording strategy of a conventional example.
Figure 25A:
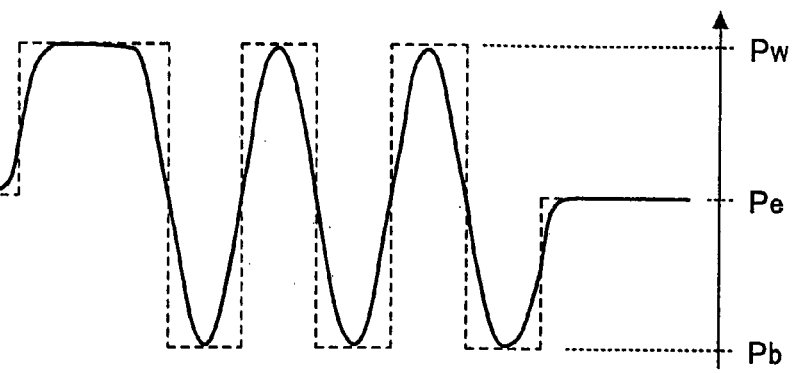
FIGS. 25A through 25C show practical luminescence waveforms in contrast with ideal irradiation waveforms.
Figure 25B:
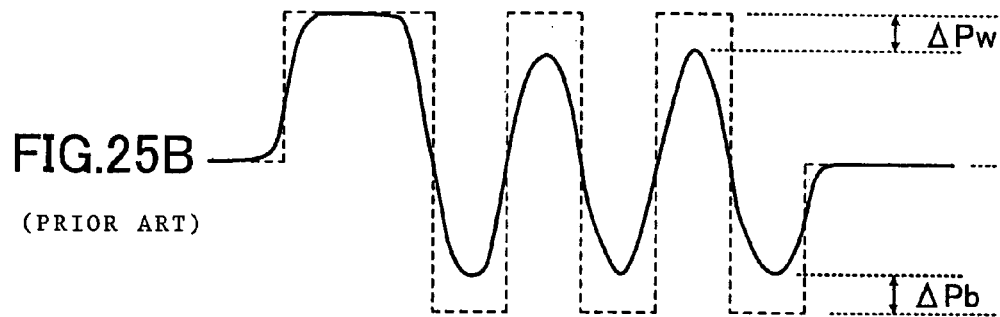
Figure 25C:
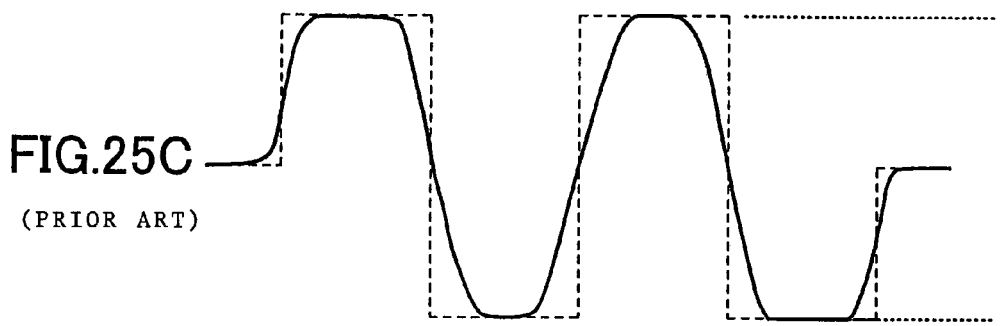

The explanations presented above are made in reference to a phase-changing type optical information recording medium. However, the present invention is also applicable to a pigment system optical information recording medium such as CD-R and DVD-R, where only additional writing is possible. In this case, as for the irradiation power, Pe can be regarded as being nearly equal to Pb (Pe≈Pb) That is, the irradiation power can be expressed by a two-value pattern, one being Pw applied to $P_{on}(n, i)$ and pulse $P_{on}(n, i+1)$, and the other being Pb applied to intervals between the pulses as shown in FIG. 23.

SPECIFIC EMBODIMENTS

Hereafter, more specific embodiments of the present invention are explained.

(Specific Embodiment 1)

On a polycarbonate substrate for CD-RW, a lower dielectric layer, a recording layer, an upper dielectric layer, and a reflective layer were formed one by one, using the sputtering method. As the material for the lower dielectric layer and the upper dielectric layer, ZnS with which 20-mol % of SiO2 was mixed was used. As the recording layer, an AgInSbTe alloy to which a minute amount of germanium was added was used. As the reflective layer, Ag was used. Thickness of the lower dielectric layer was set at 70 nm. Thickness of the recording layer was set at 15 nm. Thickness of the upper dielectric layer was set at 20 nm. Thickness of the reflective layer was set at 140 nm. Furthermore, a protection layer made of resin was formed by the spin coating method, which was hardened by irradiating an ultraviolet ray. As the material of the protection layer, an ultraviolet ray effect resin, which was commercially available as a protection layer material for CD, was used. Thickness of the protection layer was about 10 micrometers.

After the layers were formed, the recording layer is in a sudden-cooled state, and is in an amorphous state. Therefore, in order to crystallize the whole disk surface for initializing, an initialization apparatus for CD-RW was used. Initialization was performed by scanning a high output laser beam on the whole surface. The laser beam was 830 nm in wavelength, and the diameter of the beam was 1 micrometer in the scanning direction, and 80 micrometers in a direction perpendicular to the scanning direction. Irradiation intensity was 800 mW (power consumption), and scanning speed was 2.5 m/s. The initialized disk, which does not bear any record, satisfied the standards for a CD-RW disk.

A recording experiment was conducted on the initialized disk at a speed equivalent to the 24×speed of CD. Pulsetec's Industrial DDU1000 was used as the information recording and reproducing apparatus. Sony-Techtronics' AWG610 was used as the recording strategy generating apparatus. The strategy pattern generated was as shown in FIG. 7. As for the parameters, following values were used, respectively.

T=9.6 ns $T_{mp}/T$=1.125

$T_{mp}'/T$=1.563

δ/T=0.125

$T_{d1}/T=0.50$ $T_{d2}/T=0.05$ $T_{d2}'/T=0.10$

The recording conditions were as follows.

Pw=32 mW

Pe=11 mW v=28.8 m/s

The number of times of DOW=1 through 1000

(DOW=Direct Over Write: rewriting operations without erasing, and 1000 times or more to be possible according to the CD-RW standards.)

After recording, measurements of 3T mark jitter and 3T space jitter were carried out at the standard speed (v=1.2 m/s) of CD. The results as shown in Table 1 were obtained.

TABLE 1

| Number of times of DOW | 3T mark jitter (ns) | 3T space jitter (ns) |
|---|---|---|
| 0 | 17 | 19 |
| 1 | 27 | 31 |
| 10 | 23 | 27 |
| 1000 | 27 | 33 |

As shown in Table 1, the CD prepared as above satisfied the requirement of the CD-RW standards that jitter should be less than 35 ns until 1000 times of DOW.

(Specific Embodiment 2)

An 8×CD speed recording was experimented with the CD-RW disk that was prepared according to the specific embodiment 1. Only differences from the specific embodiment 1 were $T_{mp}/T$ and $T_{mp}'/T$ for structuring the recording strategy as follows.

$T_{mp}/T=0.500$ (4/9 of the specific embodiment 1)

$T_{mp}'/T=0.695$ (4/9 of the specific embodiment 1)

T=28.9 ns

Specifically, the values of δ/T, $T_{d1}/T$, $T_{d2}/T$, and $T_{d2}'/T$ were the same as the specific embodiment 1.

The recording conditions were as follows.

Pw=30 mW

Pe=9 mW v=9.6 m/s

The number of times of DOW=1 through 1000 times.

After the recording, 3T mark jitter and 3T space jitter were measured at the standard speed. The results as shown in Table 2 were obtained.

TABLE 2

| Number of times of DOW | 3T mark jitter (ns) | 3T space jitter (ns) |
|---|---|---|
| 0 | 14 | 17 |
| 1 | 25 | 28 |
| 10 | 21 | 24 |
| 1000 | 24 | 27 |

As shown in Table 2, it was confirmed that the 8× recording was possible by only changing the irradiation periods $T_{mp}$ and $T_{mp}'$ 4/9 times as long as the specific embodiment 1, offering satisfactory characteristics of jitter being less than 35 ns after 1000 times of DOW.

(Specific Embodiment 3)

In view of the results obtained in the specific embodiment 1 and the specific embodiment 2, an information recording apparatus can set the optimum recording strategy for an optical information recording medium 1 by pre-formatting the following parameters.

δ/T=0.125

$T_{d1}/T=0.50$ $T_{d2}/T=0.05$ $T_{d2}'/T=0.10$ a=3.125 b=0.188

α=3

(Effect of the Invention)

According to the present invention, a fewer number of parameters than the conventional practices are required to specify the optimum recording strategy regardless of the recording speed. Thereby, the pre-format domains can be efficiently used. Because the parameters are pre-formatted on the optical information recording medium, an information recording apparatus can easily set up the optimum recording strategy.

Further, the present invention is not limited to these embodiments and specific embodiments, but various variations and modifications may be made without departing from the scope of the present invention.

The present application is based on Japanese priority application No. 2002-136118 filed on May 10, 2002 with the Japanese Patent Office, the entire contents of which are hereby incorporated by reference.

What is claimed is:

1. A recording strategy generating method for an optical information recording medium on which information relative to a mark and a space, the space being an interval between two marks, is recorded by a PWM modulation method, the mark lasting for a time period nT, where n represents a natural number and T represents a basic clock cycle under recording conditions, and wherein:

the space is recorded by irradiating an optical beam at irradiation power Pe;

the mark is recorded by irradiating m pulses, each consisting of an optical beam at irradiation power of two levels Pw and Pb, where Pw>Pe>Pb;

an average period of the pulse irradiation for every mark is n/m;

relations n=$n_1$=2m are fulfilled where the number n is even;

relations $n=n_2=2m+1$ are fulfilled where the number n is odd;

a first pulse of the irradiation power Pw rises after elapse of time $T_{d1}$ from a start time of a logical mark;

a last pulse, which is the m-th pulse of the irradiation power Pb finishes earlier than an end time of the logical mark by time $T_{d2}$; and parameters normalized by the basic clock cycle T, namely, $T_{d1}/T$ and $T_{d2}/T$, of a recording strategy for all the marks of n>=4 are made constant independent of scanning speed, and when said method comprises the steps of:

pre-formatting a piece of information that represents the parameters $T_{d1}/T$ and $T_{d2}/T$ for structuring the recording strategy on the optical information recording medium;

reading the information representing the parameters $T_{d1}/T$ and $T_{d2}/T$ for structuring the recording strategy, the information being encoded and pre-formatted on the optical information recording medium in advance of a recording operation;

converting the information representing the parameters $T_{d1}/T$ and $T_{d2}/T$ into real number information by decoding and converting using a conversion table; and generating the recording strategy for the multi-pulse, wherein periods $T_{d1}$ and $T_{d2}$, which fulfill the recording conditions, are specified based on the real number information obtained by converting the parameters $T_{d1}/T$ and $T_{d2}/T$, wherein:

$T_{d1}$ is a first time period, $T_{d2}$ is a second time period, $T_{d1}/T$ is a rising time of the first pulse, and $T_{d2}/T$ is a rising time of the last pulse.

2. The recording strategy generation method as claimed in claim 1, further comprising:

a step for reading information representing parameters $T_{d1}'/T$ and $T_{d2}'/T$ for structuring the recording strategy, which are encoded and pre-formatted on the optical information recording medium in advance of the recording operation;

a step for converting the information representing the parameters $T_{d1}'/T$ and $T_{d2}'/T$ into real number information by decoding and converting using a conversion table; and a step for generating the recording strategy for a pulse of n=3, wherein periods $T_{d1}'$ and $T_{d2}'$, which fulfill recording conditions, are specified, based on the real number information obtained by converting the parameters $T_{d1}'/T$ and $T_{d2}'/T$, respectively, wherein:

$T_{d1}'$ is a first time period, where n=3, $T_{d2}'$ is a first time period, where n=3, $T_{d1}'/T$ is a rising time of the first pulse, where n=3, and $T_{d2}'/T$ is a rising time of the last pulse, where n=3.

3. The recording strategy generation method as claimed in claim 1, further comprising:

a step for reading information representing a parameter $T_{mp}/T$ for structuring the recording strategy, which is encoded and pre-formatted on the optical information recording medium in advance of the recording operation;

a step for converting the information representing the parameter $T_{mp}/T$ into real number information by decoding and converting using a conversion table; and a step for generating the recording strategy for a multi-pulse, wherein an irradiation period $T_{mp}$, which fulfills recording conditions, is specified based on the real number information obtained by converting the parameter $T_{mp}/T$, wherein:

$T_{mp}$ is an irradiation time period, and $T_{mp}/T$ is a an irradiation period for each of said m pulses other than the last pulse, where n is an odd number.

4. The recording strategy generation method as claimed in claim 1, further comprising:

a step for reading information representing a parameter $T_{mp}'/T$ for structuring the recording strategy, which is encoded and pre-formatted on the optical information recording medium in advance of the recording operation on the optical information recording medium;

a step for converting the information representing the parameter $T_{mp}'/T$ into real number information by decoding and converting using a conversion table; and a step for generating the recording strategy for a pulse of n=3, wherein an irradiation period $T_{mp}'$, which fulfills recording conditions, is specified, based on the real number information obtained by converting the parameter $T_{mp}'/T$, wherein:

$T_{mp}'$ is an irradiation time period, and $T_{mp}'/T$ is a an irradiation period for each of said m pulses, where n=3.

5. The recording strategy generation method as claimed in claim 1, further comprising:

a step for reading information representing a parameter $\delta$ for structuring the recording strategy, which is encoded and pre-formatted on the optical information recording medium in advance of the recording operation;

a step for converting the information representing the parameter $\delta$ into real number information by decoding and converting using a conversion table; and a step for generating the recording strategy for the multi-pulse, wherein the parameter $\delta$, which fulfills recording conditions, is specified, based on the real number information obtained by converting the parameter $\delta$, wherein:

$\delta$ is a constant.

6. The recording strategy generation method as claimed in claim 1, further comprising:

a step for reading information representing constants a, b, and the range of $\alpha$, which are encoded and pre-formatted on the optical information recording medium in advance of the recording operation;

a step for converting the information representing the constants a, b, and the range of $\alpha$ into real number information by decoding and converting using a conversion table; and a step for generating the recording strategy for the multi-pulse, wherein the constants a, b, and the range $\alpha$, which fulfill recording conditions, are specified, based on the real number information obtained by the step for converting, wherein:

a is a constant, b is a constant, and $\alpha$ represents a range of the scanning speed, at which recording can be performed on the optical information recording medium.

* * * * *